United States Patent
Akuzawa

(10) Patent No.: US 10,358,203 B2
(45) Date of Patent: Jul. 23, 2019

(54) VESSEL DISPLAY SYSTEM AND SMALL VESSEL INCLUDING THE SAME

(71) Applicant: YAMAHA HATSUDOKI KABUSHIKI KAISHA, Iwata-shi, Shizuoka (JP)

(72) Inventor: Shu Akuzawa, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 925 days.

(21) Appl. No.: 14/490,699

(22) Filed: Sep. 19, 2014

(65) Prior Publication Data

US 2015/0089434 A1    Mar. 26, 2015

(30) Foreign Application Priority Data

Sep. 26, 2013  (JP) ................. 2013-200199

(51) Int. Cl.
*G06F 15/177* (2006.01)
*B63H 25/02* (2006.01)
*B63H 20/12* (2006.01)
*B63H 20/00* (2006.01)

(52) U.S. Cl.
CPC ............ *B63H 25/02* (2013.01); *B63H 20/12* (2013.01); *B63H 2020/003* (2013.01)

(58) Field of Classification Search
CPC .. G06F 3/0482; G06F 3/0489; G06F 3/04842; G06F 3/0484; G06F 3/0481; G06F 3/04817; G06F 3/0488; G06F 3/04847; G06F 3/0486; G06F 3/04883; G06F 3/04886; G06F 17/241; G06F 3/04845; G06F 3/1454; G06F 17/30; G06F 21/32; G06F 2203/04803; G06F 3/017; G06F 3/04815; G06F 17/24; G06F 17/30867; G06F 21/31; G06F 21/84; G06F 2203/04808; G06F 15/17306; G06F 17/2247; G06F 17/2288; G06F 17/30011; G06F 17/30247; G06F 17/30554; G06F 17/30864; G06F 17/30899; G06F 17/50; G06F 21/316; G06F 21/34; G06F 2217/04; G06F 2221/032; G06F 2221/2149
USPC ......................................... 715/773
See application file for complete search history.

(56) References Cited

U.S. PATENT DOCUMENTS

| | | | | |
|---|---|---|---|---|
| 5,063,381 A * | 11/1991 | Ito | ............... | B63B 49/00 340/461 |
| 5,691,695 A * | 11/1997 | Lahiff | ............... | B60K 37/02 340/439 |
| 5,864,125 A * | 1/1999 | Szabo | ............... | G01C 21/3623 235/384 |
| 6,154,703 A * | 11/2000 | Nakai | ............... | G01C 21/3629 340/988 |

(Continued)

*Primary Examiner* — Di Xiao
(74) *Attorney, Agent, or Firm* — Keating and Bennett, LLP

(57) ABSTRACT

A vessel display system includes a first screen display unit, a second screen display unit, and a screen transition unit. The first screen display unit displays a first screen that includes vessel-related information related to navigation of a vessel. The second screen display unit displays a second screen including function information related to a function usable during the navigation of the vessel and common display information including at least one of the vessel-related information displayed in the first screen. The screen transition unit performs transition from the first screen to the second screen.

14 Claims, 23 Drawing Sheets

(56) References Cited

U.S. PATENT DOCUMENTS

| | | | | |
|---|---|---|---|---|
| 6,199,015 B1* | 3/2001 | Curtwright | ............ | G01C 21/20 340/990 |
| 6,272,405 B1* | 8/2001 | Kubota | ................. | G01C 21/12 342/357.31 |
| 6,273,771 B1* | 8/2001 | Buckley | ............... | B63H 21/213 114/144 RE |
| 6,522,347 B1* | 2/2003 | Tsuji | ...................... | G06Q 30/02 345/419 |
| 7,143,363 B1* | 11/2006 | Gaynor | ................... | B63J 99/00 340/461 |
| 7,730,401 B2* | 6/2010 | Gillespie | ............. | G06F 3/04817 345/156 |
| 2002/0101334 A1* | 8/2002 | Ueda | ..................... | B60K 35/00 340/425.5 |
| 2004/0193371 A1* | 9/2004 | Koshiji | .............. | G01C 21/3688 701/455 |
| 2012/0290200 A1* | 11/2012 | Kabel | ................... | G01C 21/22 701/409 |
| 2013/0110329 A1 | 5/2013 | Kinoshita et al. | | |
| 2013/0271301 A1* | 10/2013 | Kabel | .................... | B63B 49/00 340/987 |

\* cited by examiner

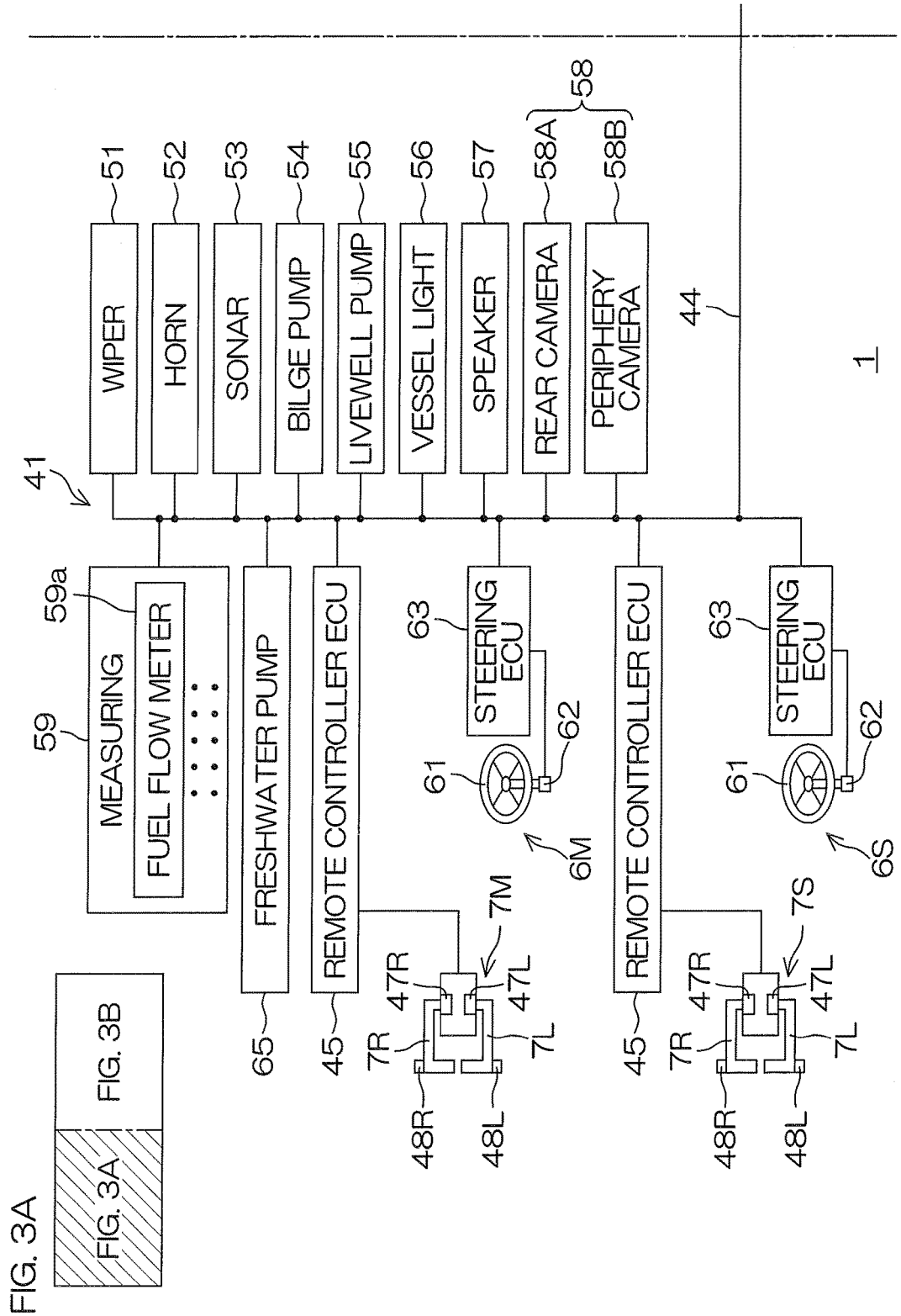

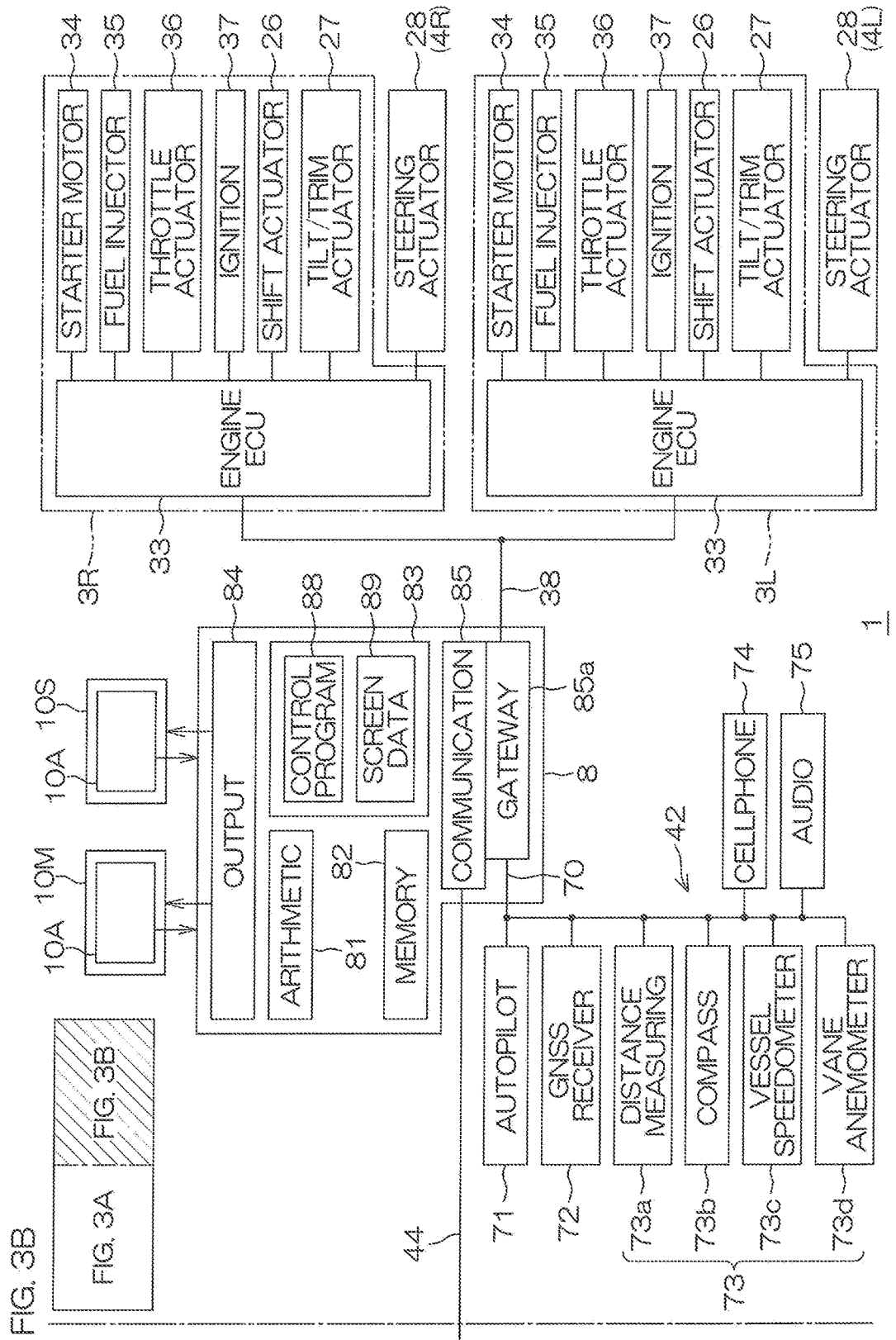

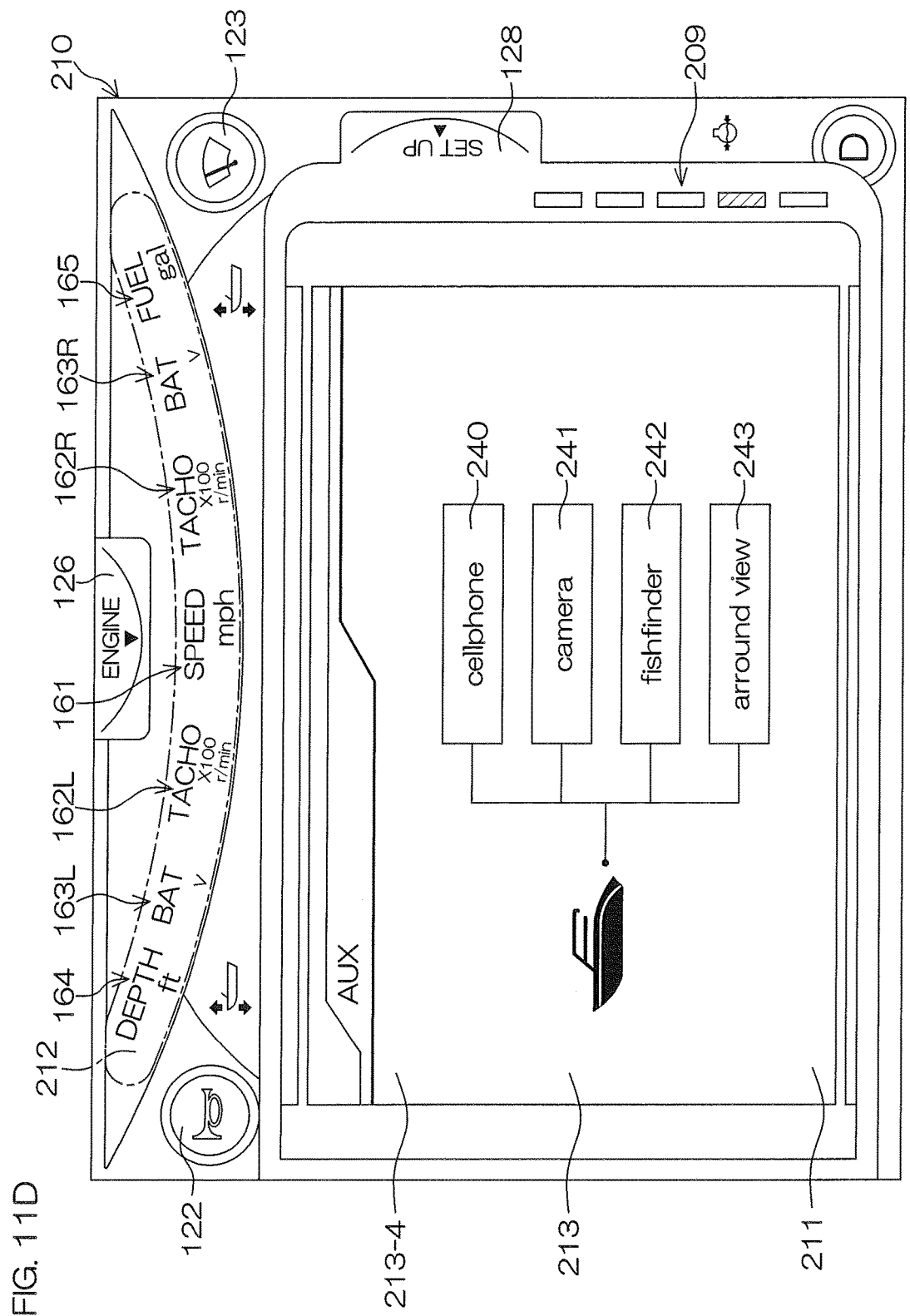

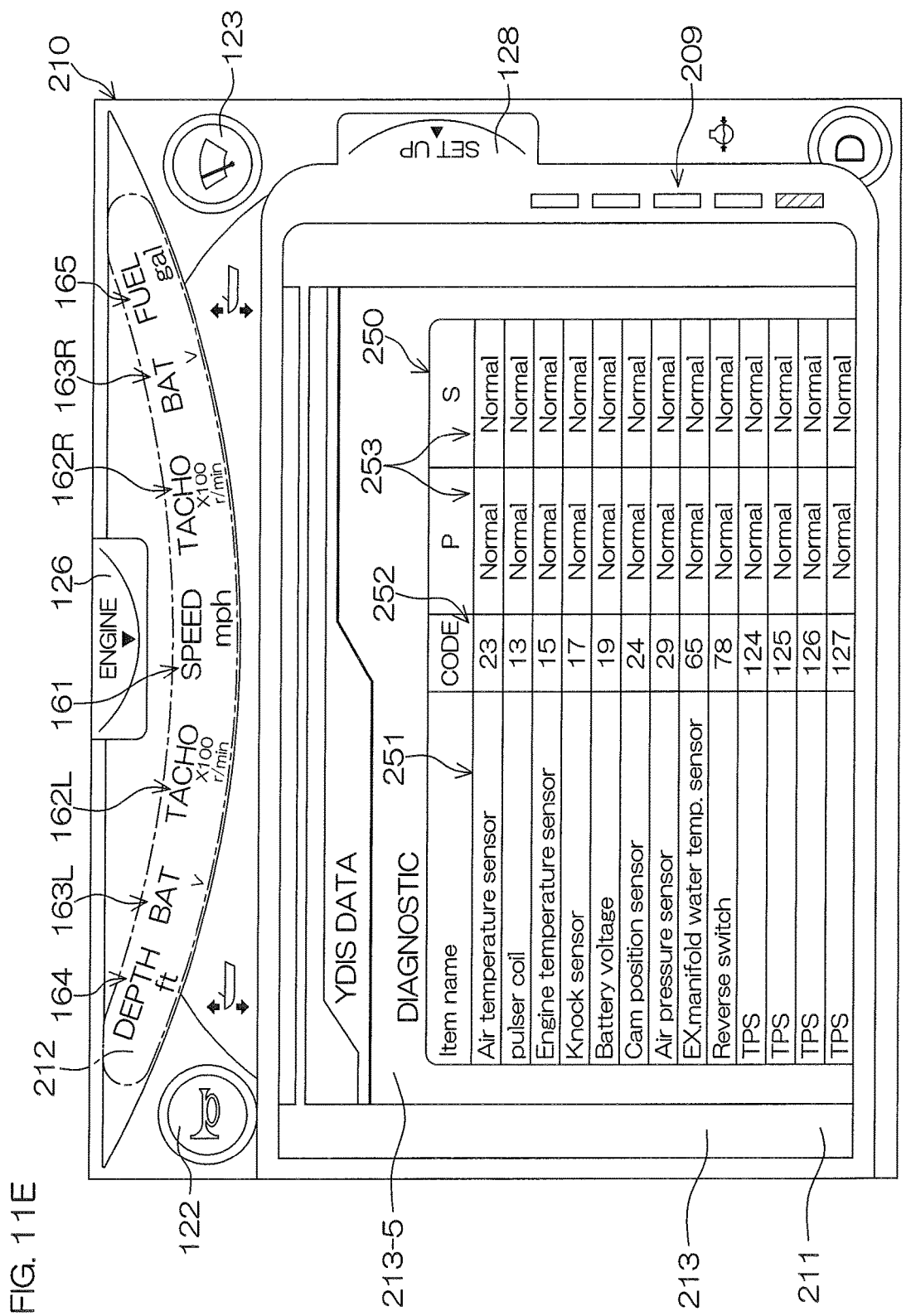

VESSEL DISPLAY SYSTEM AND SMALL VESSEL INCLUDING THE SAME

BACKGROUND OF THE INVENTION

1. Field of the Invention

The present invention relates to a vessel display system and a small vessel including the same. A small vessel refers to a vessel with a gross tonnage of less than 20 tons. However, a vessel with a gross tonnage of not less than 20 tons is considered to be a small vessel if its length is less than 20 meters.

2. Description of the Related Art

US 2013/0110329 A1 discloses a small vessel that includes a display device having a touch panel function. In addition to instruments, software keys to operate equipment included in the small vessel are displayed on the display device. Operation of the equipment included in the small vessel and inputs for vessel maneuvering can be performed by operating the software keys.

SUMMARY OF THE INVENTION

The inventor of preferred embodiments of the present invention described and claimed in the present application conducted an extensive study and research regarding vessel display systems, such as the one described above, and in doing so, discovered and first recognized new unique challenges and previously unrecognized possibilities for improvements as described in greater detail below.

Generally, instruments, various switches, and various operation equipment are provided at a vessel operator compartment of a vessel. By integrating a portion or all of these functions in a display device with a touch panel function, the layout of the vicinity of the vessel operator compartment can be simplified.

However, if numerous functions are integrated in the display device, integration within a single screen becomes impossible and it becomes necessary to switch among a plurality of display screens. For example, switching from an instrument display screen to an operation screen for operating the operation equipment must be performed. When such switching of the display screen is performed, a vessel operator becomes unable to obtain information displayed in the previous screen and therefore a need to switch to the previous screen display as necessary to check the state of the vessel, etc., arises. Therefore, when the layout is simplified by integrating a plurality of functions, there is a possibility that viewability becomes poor in particular and switching among screens must be performed frequently to acquire the necessary information.

A preferred embodiment of the present invention provides a vessel display system configured to achieve both integration of a plurality of functions and good viewability of information, and a small vessel that includes such a vessel display system.

A preferred embodiment of the present invention provides a vessel display system including a first screen display unit that displays a first screen including vessel-related information related to navigation of a vessel, a second screen display unit that displays a second screen including function information related to a function usable during the navigation of the vessel and common display information including at least one of the vessel-related information displayed in the first screen, and a screen transition unit that performs transition from the first screen to the second screen.

With this configuration, the first screen and the second screen are configured to be displayed in an alternating or switching manner. The first screen includes the vessel-related information related to the navigation of the vessel and the second screen includes the function information usable during the navigation of the vessel. The second screen also includes at least one of the vessel-related information displayed in the first screen. That is, there is common display information that is displayed in common in the first screen and the second screen. Therefore, even when a transition from the first screen to the second screen is performed, the common display information is provided to a user without requiring switching to the first screen. A vessel display system that achieves both integration of a plurality of functions and good viewability of information is provided.

In a preferred embodiment of the present invention, the common display information includes output information expressing an output of a propulsion device of the vessel. With this configuration, the output information expressing the output of the propulsion device preferably is provided to the user even when transition from the first screen to the second screen is performed. The user is thus able to know the output of the propulsion device without switching the screen display to the first screen.

In a preferred embodiment of the present invention, the common display information further includes at least one among a speed of the vessel, a water depth around the vessel, and a remaining amount of energy consumable by the vessel. With this configuration, information on the speed of the vessel, the water depth around the vessel, or the remaining amount of energy consumable by the vessel is preferably provided to the user even when the screen display transitions from the first screen to the second screen. Therefore, when the second screen is displayed, the user is able to obtain information necessary to maneuver the vessel without switching to the first screen.

In a preferred embodiment of the present invention, the second screen includes an operation key operable by an operator. With this configuration, the operation key operable by the operator is included in the second screen, so that the user who is the operator is able to operate equipment included in the vessel or perform input of a setting by operating the operation key. The second screen includes the common information, which is a portion of the vessel-related information, and the user is therefore able to obtain the common display information while performing operation of equipment included in the vessel or input of a setting. That is, there is no need to switch to the first screen to obtain the common display information.

In a preferred embodiment of the present invention, the operation key includes a menu key by which a selection is made alternatively from a plurality of functions. With this configuration, any of the plurality of functions is able to be selected and started by operation of the menu key. Multiple functions are thus integrated. A vessel display system that achieves integration of multiple functions and good viewability of information are thus provided.

In a preferred embodiment of the present invention, the plurality of functions include a vessel maneuvering input function by which an input to control a movement of the vessel is received. By this configuration, the user is able to use the vessel display system to perform an operation to control the movement of the vessel. The common display information is displayed in the second screen, and the user is therefore able to perform the operation for movement of the vessel while being provided with the common display information. A vessel display system, which integrates the vessel maneuvering function and is excellent in viewability of information, is thus provided.

In a preferred embodiment of the present invention, the plurality of functions include an equipment control input function by which an input to control equipment included in the vessel is received. With this configuration, the equipment included in the vessel is controlled by an input operation at the second screen. The common display information is displayed in the second screen, and the user therefore is able to perform the input operation to control the equipment included in the vessel while being provided with the common display information.

Examples of the equipment included in the vessel include propulsion devices, pumps, lighting equipment, etc.

In a preferred embodiment of the present invention, the operation key includes a setting key by which setting information is input. With this configuration, setting information is input by operating the setting key displayed in the second screen. The common display information is displayed in the second screen, and the user is therefore able to obtain the common display information even while inputting the setting information. A vessel display system, which integrates the setting information input function and is excellent in viewability of information, is thus achieved.

In a preferred embodiment of the present invention, the second screen is configured to display the common display information in a peripheral edge region of the second screen. With this configuration, the common display information is displayed in the peripheral edge region of the second screen. A central region of the second screen is thus preferably used for a principal function that is to be provided by the second screen. The common display information is thus capable of being provided without inhibiting the function of the second screen.

In a preferred embodiment of the present invention, the second screen is configured so that a region in which the common display information is displayed is narrower than the remaining region. With this configuration, the region in which the common display information is displayed is narrower than the other region inside the second screen. A wide region inside the second screen is thus preferably used for the principal function that is to be provided by the second screen.

In a preferred embodiment of the present invention, the first screen includes display of an operation portion configured to be operated by an operator and is configured so that a display region for the vessel-related information is wider than a display region for the operation portion. With this configuration, a wider region is secured in the first screen as the vessel-related information display region than the operation portion display region. The vessel-related information is thus provided with good viewability in the first screen.

In a preferred embodiment of the present invention, the common display information preferably is displayed in analog format in the first screen and in digital format in the second screen, for example. In the present preferred embodiment of the present invention, an intuitive display is made possible in the first screen because the common display information is displayed in the analog format. On the other hand, in the second screen, the common display information is capable of being displayed in a small display region because the common display information is displayed in the digital format. The common display information preferably is thus displayed without inhibiting the display for the principal function in the second screen.

A preferred embodiment of the present invention provides a small vessel including a plurality of equipment, a controller that is configured or programmed to control the plurality of equipment, and a vessel display system connected to the controller and having the features described above.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 3A and 3B show a block diagram for describing an electrical configuration of the small vessel.

FIG. 11D shows yet another page of the setting screen.
FIG. 11E shows yet another page of the setting screen.

DETAILED DESCRIPTION OF THE PREFERRED EMBODIMENTS

Figure 1:
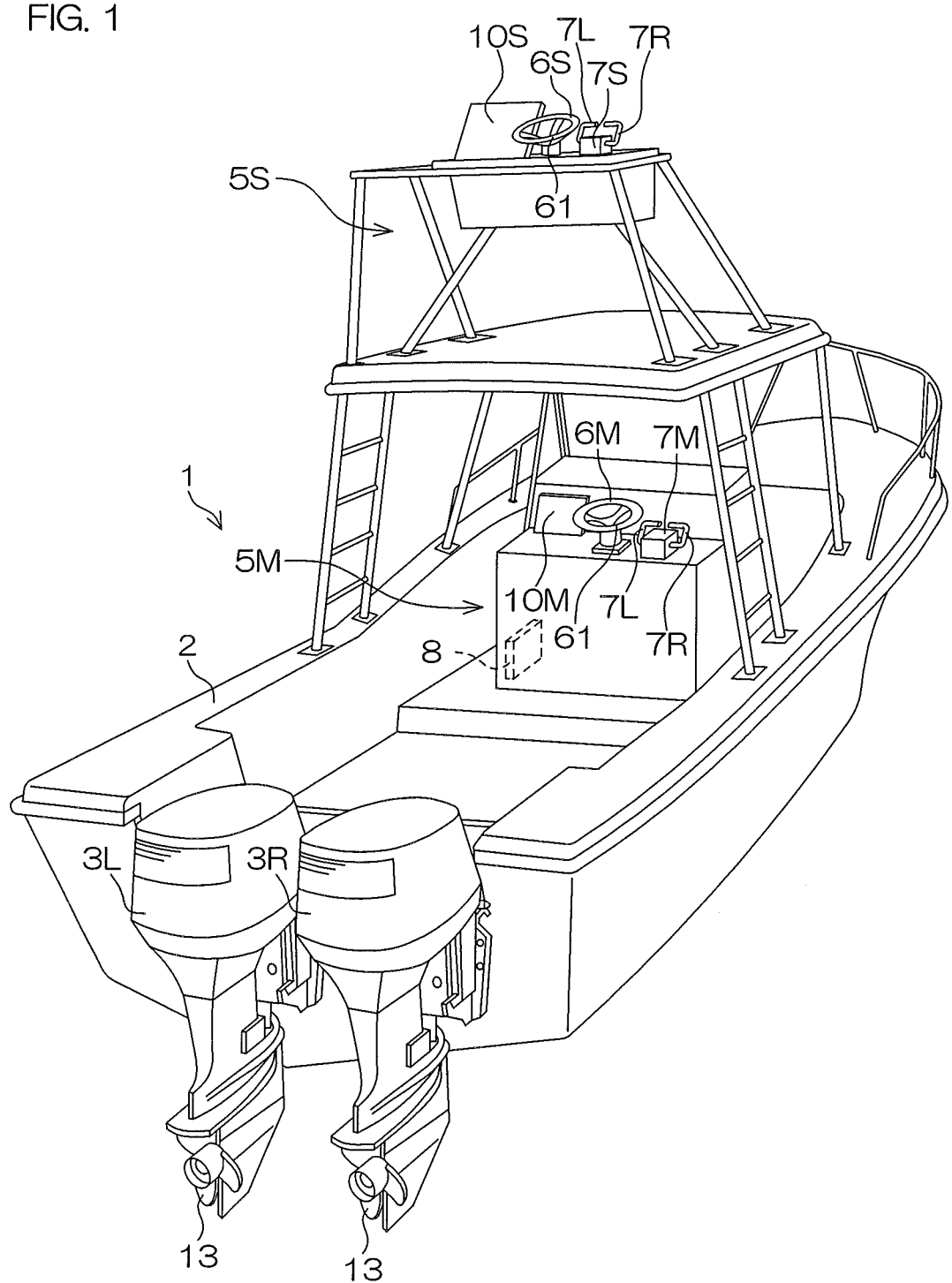
FIG. 1 is a perspective view for describing a configuration of a small vessel to which a vessel display system according to a preferred embodiment of the present invention is applied.

FIG. 1 is a perspective view for describing the configuration of a small vessel to which a vessel display system according to a preferred embodiment of the present invention is applied.

The small vessel 1 includes a hull 2 and a plurality (preferably two in the present preferred embodiment, for example) of outboard motors 3L and 3R (hereinafter referred to as "outboard motors 3" when referred to collectively). The two outboard motors 3 are mounted on a tail (stern) of the hull 2. The two outboard motors 3 include the starboard side outboard motor 3R disposed at the right side when facing the heading direction of the small vessel 1 and the portside outboard motor 3L disposed at the left side. The outboard motors 3 are an example of propulsion devices that apply propulsive forces to the hull 2.

The hull 2 includes two vessel maneuvering stations 5M and 5S (vessel operator compartments). Specifically, a main station 5M (main vessel operator compartment) is located at a center or approximate center of the hull 2 and a substation 5S (sub vessel operator compartment) is arranged thereabove. A vessel operator is capable of performing an operation for vessel maneuvering at either of the vessel maneuvering stations 5M and 5S.

A main steering apparatus 6M, a main remote controller 7M, a central controller 8, and a main display device 10M are arranged at the main station 5M. A sub steering apparatus 6S, a sub remote controller 7S, and a sub display device 10S are arranged at the substation 5S. The main display device 10M and the sub display device 10S (hereinafter referred to as "display devices 10" when referred to collectively) are configured to have a touch panel function and are used as operation panels.

The steering apparatuses 6M and 6S (hereinafter referred to as "steering apparatuses 6" when referred to collectively) are apparatuses by which the vessel operator determines the course of the small vessel 1. Specifically, each steering apparatus 6 includes a steering wheel 61 that is rotated to the left and right by the vessel operator. The outboard motor 3 is steered by rotating the steering wheel 61 and the small vessel 1 is thus made to turn to the left and right.

The remote controllers 7M and 7S (hereinafter referred to as "remote controllers 7" when referred to collectively) include a left lever 7L and a right lever 7R that are operated by the vessel operator. By operation of the left lever 7L and the right lever 7R, the outputs of the portside outboard motor 3L and the starboard side outboard motor 3R are adjusted respectively and the vessel speed are thus capable of being adjusted. Also, by operation of the left lever 7L and the right lever 7R, the directions of the propulsive forces generated respectively by the portside outboard motor 3L and the starboard side outboard motor 3R are switched between a forward drive direction and a reverse drive direction.

The display devices 10M and 10S are respectively arranged at locations that are easily viewable by the vessel operator operating the vessel at the vessel maneuvering stations 5M and 5S, that is, are arranged in front of the vessel operator. Each display device 10 is configured to display information on the small vessel 1 and provide an interface for operation of equipment included in the small vessel 1.

The central controller 8 is configured or programmed to communicate with the outboard motors 3L and 3R, the steering apparatuses 6M and 6S, the remote controller 7M and 7S, and the display devices 10M and 10S to perform integrated control of these components.

Figure 2:
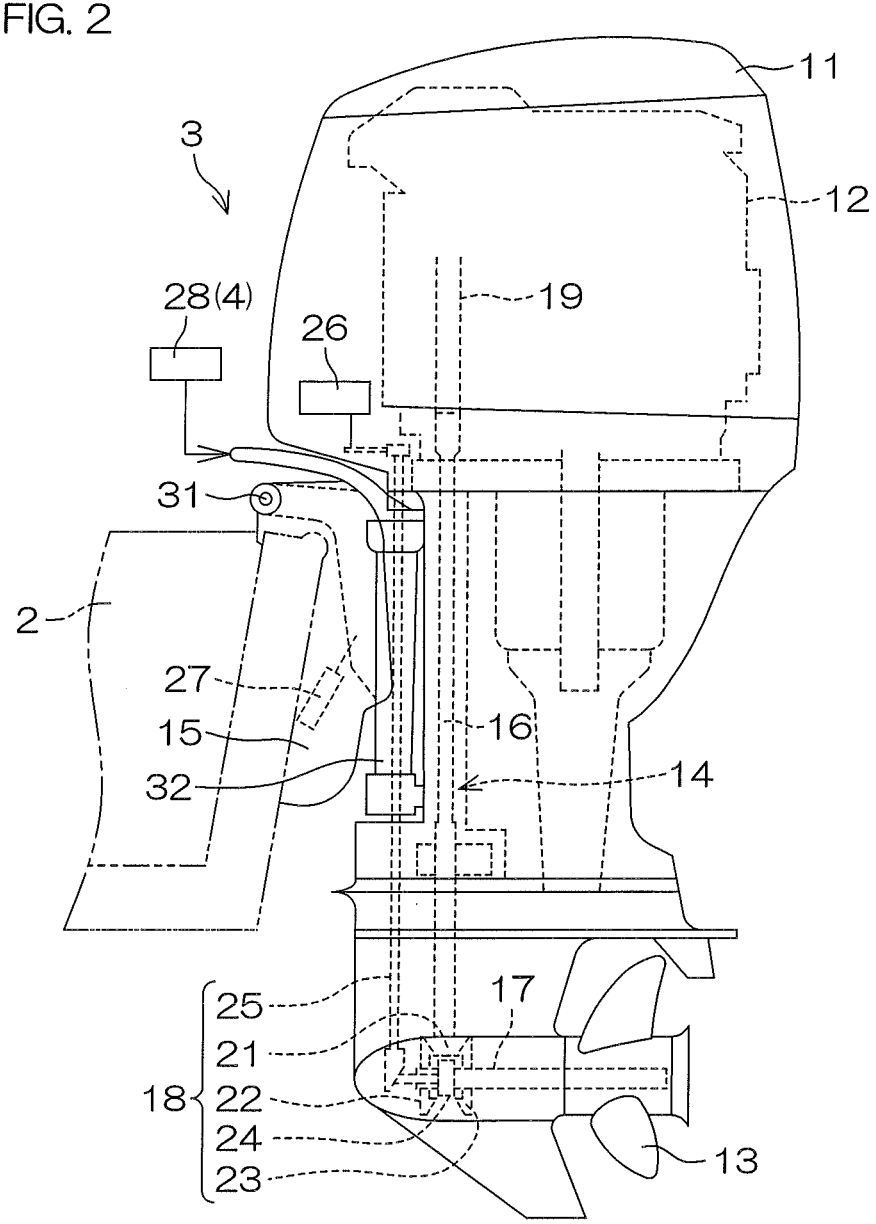
FIG. 2 is a schematic side view for describing a configuration example of an outboard motor included in the small vessel.

FIG. 2 is a schematic side view for describing the configuration of the outboard motor 3. The outboard motor 3 includes a cover member 11, an engine 12, a propeller 13, a power transmitting mechanism 14, and a bracket 15. The cover member 11 houses the engine 12 and the power transmitting mechanism 14. The engine 12 is arranged in an upper space inside the cover member 11. The engine 12 is an example of a power source that generates the propulsive force. The propeller 13 is driven to rotate by the driving force generated by the engine 12. The propeller 13 is arranged outside the cover member 11 at a lower portion of the outboard motor 3. The power transmitting mechanism 14 transmits the driving force of the engine 12 to the propeller 13. The power transmitting mechanism 14 includes a driveshaft 16, a propeller shaft 17, and a shift mechanism 18.

The driveshaft 16 is arranged to extend along an up/down direction. The driveshaft 16 is coupled to a crankshaft 19 of the engine 12 and transmits the power generated by the engine 12. The propeller shaft 17 is arranged to extend along a front/rear direction. The propeller shaft 17 is coupled via the shift mechanism 18 to a lower portion of the driveshaft 16. The propeller shaft 17 transmits the driving force of the driveshaft 16 to the propeller 13.

The shift mechanism 18 changes the rotation direction of the power transmitted from the driveshaft 16 to the propeller shaft 17. The shift mechanism 18 includes a pinion gear 21, a forward drive gear 22, a reverse drive gear 23, and a dog clutch 24. The pinion gear 21 is fixed to a lower end of the driveshaft 16. The forward drive gear 22 and the reverse drive gear 23 are arranged on the propeller shaft 17 and are configured so as to be rotatable relative to the propeller shaft 17. The pinion gear 21 is engaged with the forward drive gear 22 and the reverse drive gear 23. The dog clutch 24 is splined to the propeller shaft 17 and is arranged between the forward drive gear 22 and the reverse drive gear 23. The dog clutch 24 is movable along the propeller shaft 17 and rotates together with the propeller shaft 17. The dog clutch 24 is movable to a forward drive position, a neutral position, and a reverse drive position on the propeller shaft 17. The forward drive position is a position at which the dog clutch 24 engages with the forward drive gear 22 and does not engage with the reverse drive gear 23. The reverse drive position is a position at which the dog clutch 24 engages with the reverse drive gear 23 and does not engage with the forward drive gear 22. The neutral position is a position at which the dog clutch 24 engages with neither the forward drive gear 22 nor the reverse drive gear 23 and is a position between the forward drive position and the reverse drive position. When the dog clutch 24 is positioned at the forward drive position, the rotation of the driveshaft 16 is transmitted to the propeller shaft 17 via the forward drive gear 22. The propeller 13 is thus made to rotate in the direction of generating a propulsive force that drives the hull 2 forward. When the dog clutch 24 is positioned at the reverse drive position, the rotation of the driveshaft 16 is transmitted to the propeller shaft 17 via the reverse drive gear 23. The propeller 13 is thus made to rotate in the direction of generating a propulsive force that drives the hull 2 in reverse. When the dog clutch 24 is positioned at the neutral position, the rotation of neither the forward drive gear 22 nor the reverse drive gear 23 is transmitted to the propeller shaft 17. Therefore, a driving force is not transmitted to the propeller 13.

The shift mechanism 18 further includes a shift rod 25 configured to move the dog clutch 24 along the propeller shaft 17. The shift rod 25 is driven by a shift actuator 26. Therefore, the dog clutch 24 is configured to be controlled to be at any of the forward drive position, the neutral position, and the reverse drive position by controlling the operation of the shift actuator 26. The position of the dog clutch 24 may at times be referred to as the "shift position."

The bracket 15 is a mechanism configured to mount the outboard motor 3 on the hull 2. The outboard motor 3 is mounted so as to be turnable around a tilt shaft 31 and a steering shaft 32 with respect to the bracket 15. The tilt shaft 31 extends in a width direction (horizontal direction) of the hull 2. The steering shaft 32 is perpendicular or substantially perpendicular to the tilt shaft 31 and extends along or substantially along the up/down direction in the usage state of the outboard motor 3. A tilt/trim actuator 27 that turns the outboard motor 3 around the tilt shaft 31 is included. By turning the outboard motor 3 around the tilt shaft 31, a trim angle of the outboard motor 3 is changed. The trim angle corresponds to the angle of mounting of the outboard motor 3 with respect to the hull 2.

A steering mechanism 4 is included in order to turn the outboard motor 3 with respect to the hull 2. The steering mechanism 4 is configured to turn the outboard motor 3 around the steering shaft 32. The steering mechanism 4 includes a steering actuator 28 as a power source. A steering angle is capable of being changed by turning the outboard motor 3 around the steering shaft 32 via the steering mechanism 4. The steering angle is an angle that the direction of the propulsive force of the outboard motor 3 defines with respect to a central line extending in the front/rear direction of the hull 2.

FIGS. 3A and 3B show a block diagram for describing the electrical configuration of the small vessel 1. FIGS. 3A and 3B are to be combined as shown in the respective figures to make up the single block diagram.

An equipment network system, including the central controller 8, is constructed inside the small vessel 1. The equipment network system includes the outboard motors 3L and 3R, the steering apparatuses 6M and 6S, the remote controllers 7M and 7S, the central controller 8, the display devices 10M and 10S, a first additional function system 41 and a second additional function system 42.

Each outboard motor 3 includes an engine ECU (electronic control unit) 33, a starter motor 34, a fuel injector 35, a throttle actuator 36, an ignition device 37, the shift actuator 26, the tilt/trim actuator 27, etc. The engine ECU 33 is configured or programmed to control operations of the starter motor 34, the fuel injector 35, the throttle actuator 36, the ignition device 37, the shift actuator 26, and the tilt/trim actuator 27. Further, the engine ECU 33 is configured or programmed to control the steering actuator 28 of the steering mechanism 4. In FIG. 3B, the steering mechanisms 4 respectively corresponding to the portside outboard motor 3L and the starboard side outboard motor 3R are indicated by symbols 4L and 4R.

The starter motor 34 starts the engine 12. The fuel injector 35 injects a fuel supplied to a combustion chamber of the engine 12. The throttle actuator 36 changes the opening degree of a throttle valve of the engine 12. The ignition device 37 ignites an air-fuel mixture inside the combustion chamber. The shift actuator 26 drives the shift rod 25 to switch the position (shift position) of the dog clutch 24 to any of the forward drive position, the neutral position, and the reverse drive position. The tilt/trim actuator 27 turns the outboard motor 3 around the tilt shaft 31. The steering actuator 28 turns the outboard motor 3 around the steering shaft 32.

The engine ECU 33 stores a control program of the engine in an internal memory (not shown). The engine ECU 33 is connected via a communication line 38 to the central controller 8. Output command signals and steering command signals, corresponding to inputs from the steering apparatuses 6 and the remote controllers 7, are input from the central controller 8 into the engine ECU 33. Also, detection signals of various sensors (not shown) installed in the outboard motor 3 and the steering mechanism 4 are input into the engine ECU 33. Based on the command signals and the detection signals, the engine ECU 33 controls the operations of the starter motor 34, the fuel injector 35, the throttle actuator 36, the ignition device 37, the shift actuator 26, the tilt/trim actuator 27, the steering actuator 28, etc. The engine ECU 33 performs communication with the central controller 8 using a CAN (control area network) protocol.

Each remote controller 7 includes a remote controller ECU 45. The remote controller ECU 45 is configured or programmed to perform communication with the central controller 8 via a communication line 44. In the present preferred embodiment, each remote controller 7 includes two levers 7L and 7R and two operation position sensors 47L and 47R respectively detecting operation positions of the levers 7L and 7R. Output signals of the operation position sensors 47L and 47R are input into the remote controller ECU 45 and transmitted from the remote controller ECU 45 to the central controller 8 via the communication line 44. Each of the levers 7L and 7R is an operating member that is configured to be inclined in the front/rear direction. In accordance with the inclination positions in the front/rear direction of the levers 7L and 7R, the central controller 8 is configured or programmed to provide the output command signals, including a shift command signal and an engine speed command signal, to the engine ECUs 33 of the corresponding outboard motors 3L and 3R. Each engine ECU 33 is thus made to drive the shift actuator 26 in accordance with the shift command signal and drive the throttle actuator 36 in accordance with the engine speed command signal. Switching of the shift positions of the outboard motors 3L and 3R and changing of the throttle opening degree of the engine 12 are thus performed in accordance with operations of the levers 7L and 7R. The directions of propulsive forces, the generation/non-generation of propulsive force, and outputs of the outboard motors 3L and 3R are thus set. The output of the outboard motor 3 is the magnitude of the propulsive force and, more specifically, is the engine speed.

In the present preferred embodiment, the levers 7L and 7R are respectively provided with tilt switches 48L and 48R. When the tilt switches 48L and 48R are operated, the operation signals are input into the remote controller ECU 45 and further transmitted from the remote controller ECU 45 to the central controller 8 via the communication line 44. In accordance with operations of the tilt switches 48L and 48R, the central controller 8 inputs trim command signals into the engine ECUs 33 of the corresponding outboard motors 3L and 3R. Each engine ECU 33 drives the tilt/trim actuator 27 accordingly. The trim angle of the outboard motor 3 is thus changed.

Each steering apparatus 6 includes the steering wheel 61, a steering position sensor 62, and a steering ECU 63. The steering position sensor 62 detects an operation amount, in other words, an operation angle of the steering wheel 61. The operation angle detected by the steering position sensor 62 is transmitted from the steering ECU 63 to the central controller 8 via the communication line 44. The central controller 8 provides the steering command signals corresponding to the operation angle to the engine ECUs 33 of the outboard motors 3L and 3R. Each engine ECU 33 drives the steering actuator 28 based on the steering command signal. The outboard motor 3 is thus steered in accordance with the operation angle of the steering wheel 61.

The first additional function system 41 preferably includes a wiper 51, a horn 52, a sonar 53, a bilge pump 54, a livewell pump 55, a freshwater pump 65, a vessel light 56, a speaker 57, a camera 58, and various measuring equipment 59. The equipment constituting the first additional function system 41 are connected to the central controller 8 via the communication line 44.

The wiper 51 is mounted on a front windshield in front of the vessel maneuvering station 5 and wipes off water drops on the outer surface of the front windshield. The horn 52 generates a warning sound (alarm). The sonar 53 is a device that emits sound waves in the water in a periphery of the hull 2 to measure the position of an underwater object and is used to find a school of fish underwater, etc. The bilge pump 54 is a pump that pumps water retained at the vessel bottom to the exterior and a plurality thereof may be provided. The livewell pump 55 is a pump that replaces the water in a livewell provided in the hull 2. The freshwater pump 65 is a pump that supplies freshwater that has been loaded into the vessel in advance. The vessel light 56 is a lighting device included in the small vessel 1 and may be a mast head light, stern light, anchor light, navigation light, cabin light, etc. The speaker 57 is arranged inside the vessel and outputs sounds. The camera 58 is a device that takes an image of a periphery of the small vessel 1 and generates electronic data (image data) of the image taken. The image data output by the camera 58 are transmitted to the central controller 8. A plurality of the cameras 58 may be included. Specifically, a rear camera 58A that takes an image of the rear of the hull 2 or a periphery camera 58B necessary for synthesizing planar images of the periphery of the hull 2 (so-called around view) may be included. The various measuring equipment 59 preferably includes a fuel flow meter 59a, etc. The fuel flow meter 59a is a device that measures the flow rate of fuel fed to the engine 12.

The second additional function system 42 includes an autopilot device 71, a GNSS receiver 72, and various measuring equipment 73. The second additional function system 42 may further include other additional function devices, such as a cellphone (in particular, a smartphone) 74, an audio device, 75, etc. The equipment constituting the second additional function system 42 are connected to the central controller 8 via a communication line 70.

The autopilot device 71 is a device that is configured to maintain a set course. More specifically, it is a device, which, when a destination is set, plans a route from the current position to the destination by automatic calculation and sets the course in accordance with the planned route. When the actual course of the small vessel 1 deviates from the set course, the autopilot device 71 transmits a command signal to correct the course of the small vessel 1 to the central controller 8. Based on the command signal from the autopilot device 71, the central controller 8 transmits a steering command signals to correct the course to the engine ECUs 33 of the outboard motors 3L and 3R. The engine ECU 33 of each outboard motor 3 thus controls the steering actuator 28 in accordance with the steering command signals for course correction. The course of the small vessel 1 is thus corrected.

The GNSS receiver 72 is a receiver of GNSS (global navigation satellite systems), such as GPS, and is a current position detection unit that measures the current position of the small vessel 1. The various measuring equipment 73 may include a distance measuring unit 73a, a compass 73b, a vessel speedometer 73c, a vane anemometer 73d, etc. The distance measuring unit 73a uses a sonar, laser, camera image, etc., to measure the distance from the small vessel 1 to an object (for example, a docking object). The compass 73b may include, for example, from a geomagnetic sensor, etc., and is configured to measure the bow direction of the small vessel 1 (the heading of the hull 2). The vessel speedometer 73c measures the running speed of the small vessel 1. The vane anemometer 73d measures the wind direction and wind speed around the small vessel 1.

The central controller 8 is configured or programmed to function as a network host of the equipment network system. The central controller 8 includes an arithmetic device 81, such as a CPU, etc., a memory 82, a storage device 83, an output device 84, and a communication device 85. The storage device 83 may be a fixed storage medium defined by a hard disk or flash memory, etc., or may be a detachable storage medium, such as a memory card or a USB memory, etc. A control program 88 executed by the arithmetic device 81 and screen data 89 are stored in the storage device 83. By the arithmetic device 81 executing the control program, the central controller 8 is configured or programmed to provide a plurality of functional processing units. The screen data 89 are data expressing screens displayed on the display devices 10. The screen data 89 include screen data corresponding to a plurality of screens.

The output device 84 is a device that outputs image signals to the respective display devices 10. The communication device 85 is a device that is configured to perform communication with the outboard motors 3L and 3R, the steering apparatuses 6M and 6S, the remote controllers 7M and 7S, the first additional function system 41, and the second additional function system 42. The communication device 85 includes a plurality of ports to which the outboard motors 3L and 3R, the steering apparatuses 6M and 6S, the remote controllers 7M and 7S, the first additional function system 41, and the second additional function system 42 are connected. The communication device 85 preferably includes a gateway 85a configured to connect the second additional function system 42.

The equipment of the first additional function system 41 are, for example, equipment provided by the manufacturer of the outboard motors 3. The communication line 44 connected to these equipment is thus connected directly to the communication device 85. The steering apparatuses 6 and the remote controllers 7 are also equipment provided by the manufacturer of the outboard motor 3 and these equipment are also connected directly to the communication device 85 by the communication line 44. The communication line 38 connected to the outboard motors 3L and 3R is also connected directly to the communication device 85.

On the other hand, the equipment of the second additional function system 42 may be equipment made by so-called third parties that differ from the manufacturer of the outboard motors 3. The communication line 70 connected to the equipment of the second additional function system 42 is connected to the communication device 85 via the gateway 85a.

Each display device 10 displays information on the small vessel 1 via a GUI (graphical user interface). The display device 10 displays information on the equipment connected to the central controller 8. The display device 10 may, for example, be a liquid crystal display or an organic EL (electro-luminescence) display, etc. The display device 10 is configured to have a touch panel function. That is, a touch panel 10A is provided on the display screen of the display device 10. An output signal of the touch panel 10A is input into the central controller 8. A user is able to operate the touch panel 10A to switch the display screen of the display device 10 or operate a displayed button (software key) to perform operation of equipment included in the small vessel 1, etc.

Figure 4:
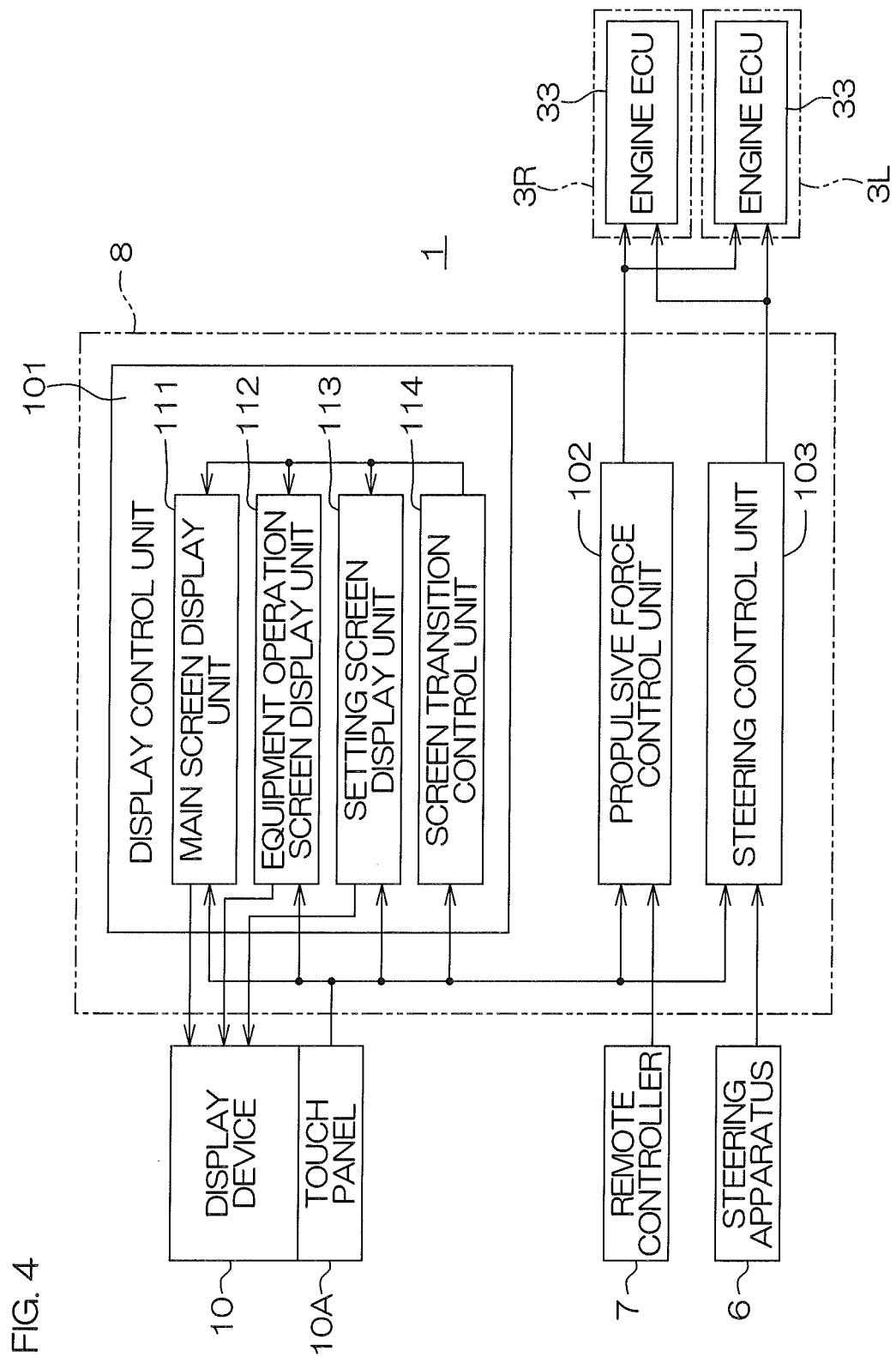
FIG. 4 is a block diagram for describing a functional configuration of a central controller included in the small vessel.

FIG. 4 is a block diagram for describing the functional configuration of the central controller 8. The central controller 8 is configured or programmed to include the plurality of functional processing units that are preferably realized or embodied in software form by the arithmetic device 81 executing the control program 88. The plurality of functional processing units include a display control unit 101, a propulsive force control unit 102, and a steering control unit 103.

The display control unit 101 is configured or programmed to supply screen data to be displayed on the display devices 10 to the output device 84 to control the displays on the display devices 10. The display control unit 101 is configured or programmed to include a main screen display unit 111, an equipment operation screen display unit 112, a setting screen display unit 113, and a screen transition control unit 114.

The main screen display unit 111 is a first screen display unit that makes a main screen be displayed as an example of a first screen according to various preferred embodiments of the present invention on each display device 10. The main screen is a screen displayed on the display device 10 during ordinary vessel maneuvering. "During ordinary vessel maneuvering" mainly corresponds to a case where the small vessel 1 is made to run at high speed by operation of the steering apparatus 6 and the remote controller 7. The equipment operation screen display unit 112 is an example of a second screen display unit that makes an equipment operation screen, differing from the main screen, be displayed on the display device 10. The equipment operation screen is an example of a second screen according to various preferred embodiments of the present invention and provides an interface for operation of the various equipment included in the small vessel 1. The setting screen display unit 113 is another example of the second screen display unit that makes a setting screen for various settings be displayed on the display device 10. The setting screen is another example of the second screen according to various preferred embodiments of the present invention and provides an interface configured for setting of the equipment installed in the small vessel 1. The screen transition control unit 114 controls the transition of screens displayed on the display device 10. Specifically, when an input operation to provide screen switching is performed on the touch panel 10A of the display device 10, a screen switching command signal is provided to the main screen display unit 111, the equipment operation screen display unit 112, and the setting screen display unit 113.

The propulsive force control unit 102 outputs the output command signals (shift command signals and engine speed command signals) to the engine ECUs 33 of the outboard motors 3L and 3R. The steering control unit 103 outputs the steering command signals to the engine ECUs 33 of the outboard motors 3L and 3R. The propulsive force control unit 102 is configured or programmed to generate the output command signals in accordance with the output of the remote controller 7 and to also generate the output command signals in accordance with operation of the touch panel 10A on the equipment operation screen in some cases. Similarly, the steering control unit 103 is configured or programmed to generate the steering command signals in accordance with the output of the steering apparatus 6 and may also generate the steering command signals in accordance with operation of the touch panel 10A on the equipment operation screen in some cases.

Figure 5A:
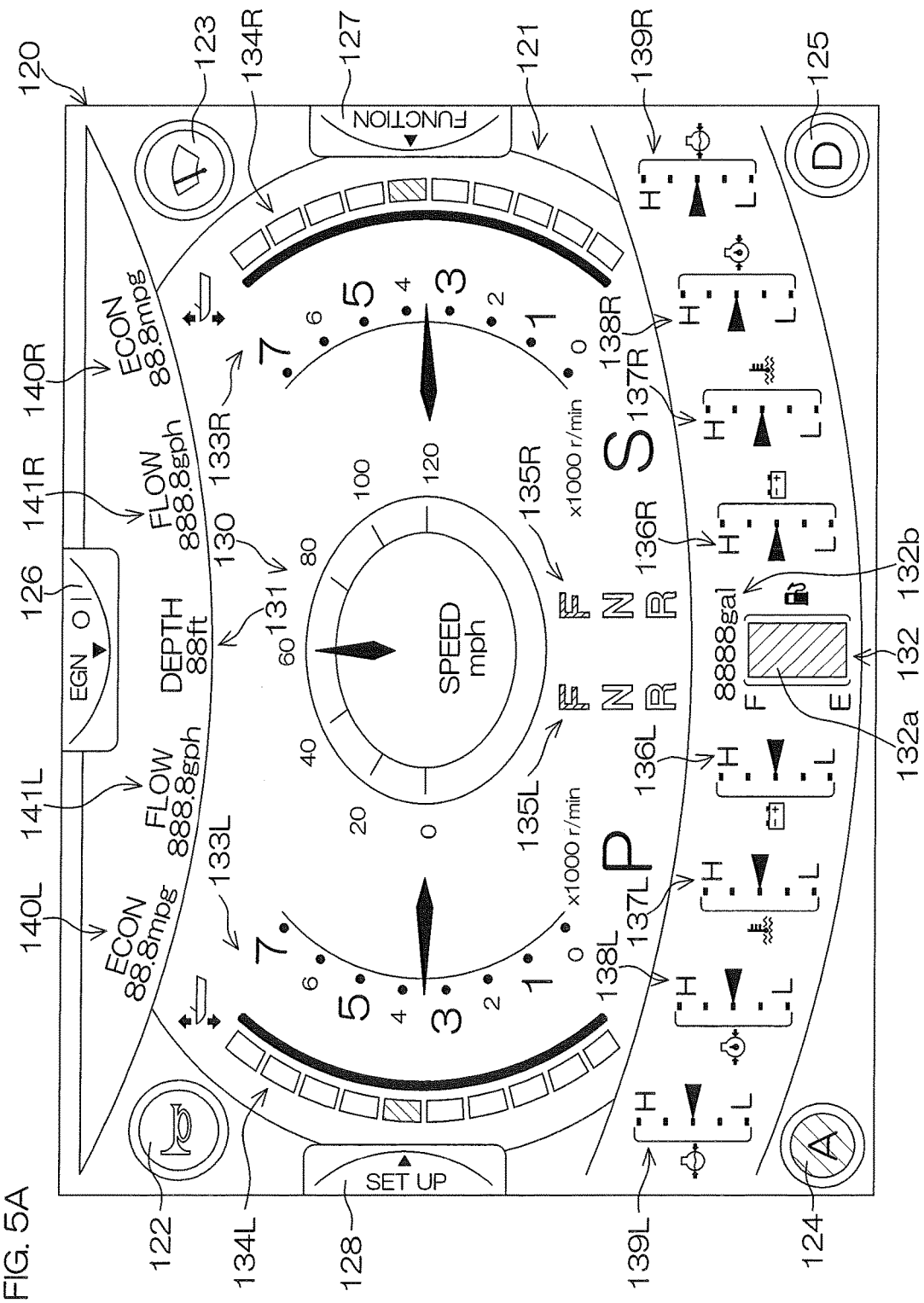
FIG. 5A shows an example of a main screen displayed on a display device included in the small vessel.

FIG. 5A shows an example of the main screen displayed on the display device 10. The main screen 120 is a screen that is displayed during ordinary vessel maneuvering, in which vessel maneuvering is performed by operating the steering apparatus 6 and the remote controller 7. The main screen 120 shown in FIG. 5A includes a vessel-related information display area 121, a horn switch 122, a wiper switch 123, an analog button 124, a digital button 125, an engine tab 126, a function tab 127, and a setup tab 128.

The vessel-related information display area 121 includes a vessel speed display 130, a water depth display 131, and a remaining fuel amount display 132. Further, the display area 121 includes, in correspondence to the portside outboard motor 3L, an engine speed display 133L, a trim angle display 134L, a shift position display 135L, a battery voltage display 136L, an engine temperature display 137L, a cooling water pressure display 138L, a lubricating oil pressure display 139L, a fuel economy display 140L, and a fuel flow rate display 141L. Similarly, the display area 121 includes, in correspondence to the starboard side outboard motor 3R, an engine speed display 133R, a trim angle display 134R, a shift position display 135R, a battery voltage display 136R, an engine temperature display 137R, a cooling water pressure display 138R, a lubricating oil pressure display 139R, a fuel economy display 140R, and a fuel flow rate display 141R.

In the example of FIG. 5A, the vessel speed display 130 is positioned at the center of the main screen 120, the engine speed display 133L for the portside outboard motor 3L is positioned at the left side of the vessel speed display 130, and the engine speed display 133R for the starboard side outboard motor 3R is positioned at the right side of the vessel speed display 130. The shift position display 135L for the portside outboard motor 3L and the shift position display 135R for the starboard side outboard motor 3R are positioned at left and right sides below the vessel speed display 130. The vessel speed display 130 and the engine speed displays 133L and 133R are displayed preferably in the form of analog meters and each of the vessel speed and the engine speeds is displayed by an indicator (indicator needle) indicating the corresponding position on a scale. The shift position displays 135L and 135R are displayed by lighting up of a character among "F," "N," and "R," which indicate the forward drive position, the neutral position, and the reverse drive position, respectively. "Lighting up" specifically refers to displaying of the corresponding character in a color that distinguishes it from the other characters.

The trim angle display 134L for the portside outboard motor 3L is positioned at the left side of the engine speed display 133L for the portside outboard motor 3L. Also, the trim angle display 134R for the starboard side outboard motor 3R is positioned at the right side of the engine speed display 133R for the starboard side outboard motor 3R. The trim angle displays 134L and 134R respectively include multiple segments arrayed to define arcuate shapes that are outwardly convex in the left and right directions and each is configured to display a trim angle by lighting up of one segment corresponding to the trim angle. "Lighting up" specifically refers to displaying of the corresponding segment in a color that distinguishes it from the other segments. In FIG. 5A, the segments in the lit state are indicated by slanted lines.

The water depth display 131 is positioned above the vessel speed display 130. The water depth display 131 displays the water depth by a numerical value. The fuel flow rate display 141L and the fuel economy display 140L for the portside outboard motor 3L are positioned successively toward the left side from the water depth display 131. The fuel flow rate display 141R and the fuel economy display 140R for the starboard side outboard motor 3R are positioned successively toward the right side from the water depth display 131. The fuel flow rate displays 141L and 141R and the fuel economy displays 140L and 140R are all displayed by numerical values. The fuel flow rate is the fuel consumption amount per unit time and is the flow rate of the fuel supplied to the engine 12 of the outboard motor 3. The fuel economy is the running distance per unit amount of fuel.

The remaining fuel amount display 132 is positioned below the vessel speed display 130. In the present example, the remaining fuel amount display 132 includes a bar display 132*a* that varies in length (height) in a range from empty (E) to full (F). Also in the present example, the remaining fuel amount display 132 includes a remaining fuel amount numerical display 132*b*. Information displays concerning the portside outboard motor 3L, specifically, the battery voltage display 136L, the engine temperature display 137L, the cooling water pressure display 138L, and the lubricating oil pressure display 139L are positioned successively toward the left side from the remaining fuel amount display 132. Similarly, information displays concerning the starboard side outboard motor 3R, specifically, the battery voltage display 136R, the engine temperature display 137R, the cooling water pressure display 138R, and the lubricating oil pressure display 139R are positioned successively toward the right side from the remaining fuel amount display 132. In the example of FIG. 5A, these respective displays are displayed preferably in the form of analog meters and the corresponding numerical value is displayed by an indicator (indicator needle) indicating the corresponding position on a scale. The value is normal if the indicator indicates an intermediate position between a high value (H) and a low value (L).

As described above, in a case where, for example, two outboard motors are provided, the respective displays of items in common to both outboard motors (remaining fuel amount, etc.) and information related to the vessel (vessel speed, water depth, etc.) may be positioned at the center or approximate center of the main screen 120. On the other hand, the displays of items related to the respective individual outboard motors (the engine speeds, shift positions, trim angles, etc., of the respective outboard motors) preferably are distributed at the left and right sides of the main screen 120.

The horn switch 122 is positioned at the upper left corner of the main screen 120. The horn switch 122 preferably is a software key configured to actuate the horn 52. The wiper switch 123 is positioned at the upper right corner of the main screen 120. The wiper switch 123 is a software key configured to actuate the wiper 51. The switches 122 and 123 are put in a lit display state when the corresponding device is being actuated and put in an unlit display state when the corresponding device is not actuated. The lit display state and the unlit display state are distinguished by colored displays of different colors.

The analog button 124 is positioned at the lower left corner of the main screen 120, and the digital button 125 is positioned at the lower right corner of the main screen 120. The analog button 124 preferably is a software key configured to set the main screen 120 to an analog format display screen (the screen shown in FIG. 5A). The digital button preferably is a software key configured to set the main screen 120 to a digital format display screen (see FIG. 5D). When the main screen 120 is displayed in the analog format, the analog button 124 is put in the lit display state and the digital button 125 is put in the unlit display state. Oppositely, when the main screen 120 is displayed in the digital format, the analog button 124 is put in the unlit display state and the digital button 125 is put in the lit display state. In the drawings, the buttons in the lit display states are indicated by slanted lines.

Figure 5B:
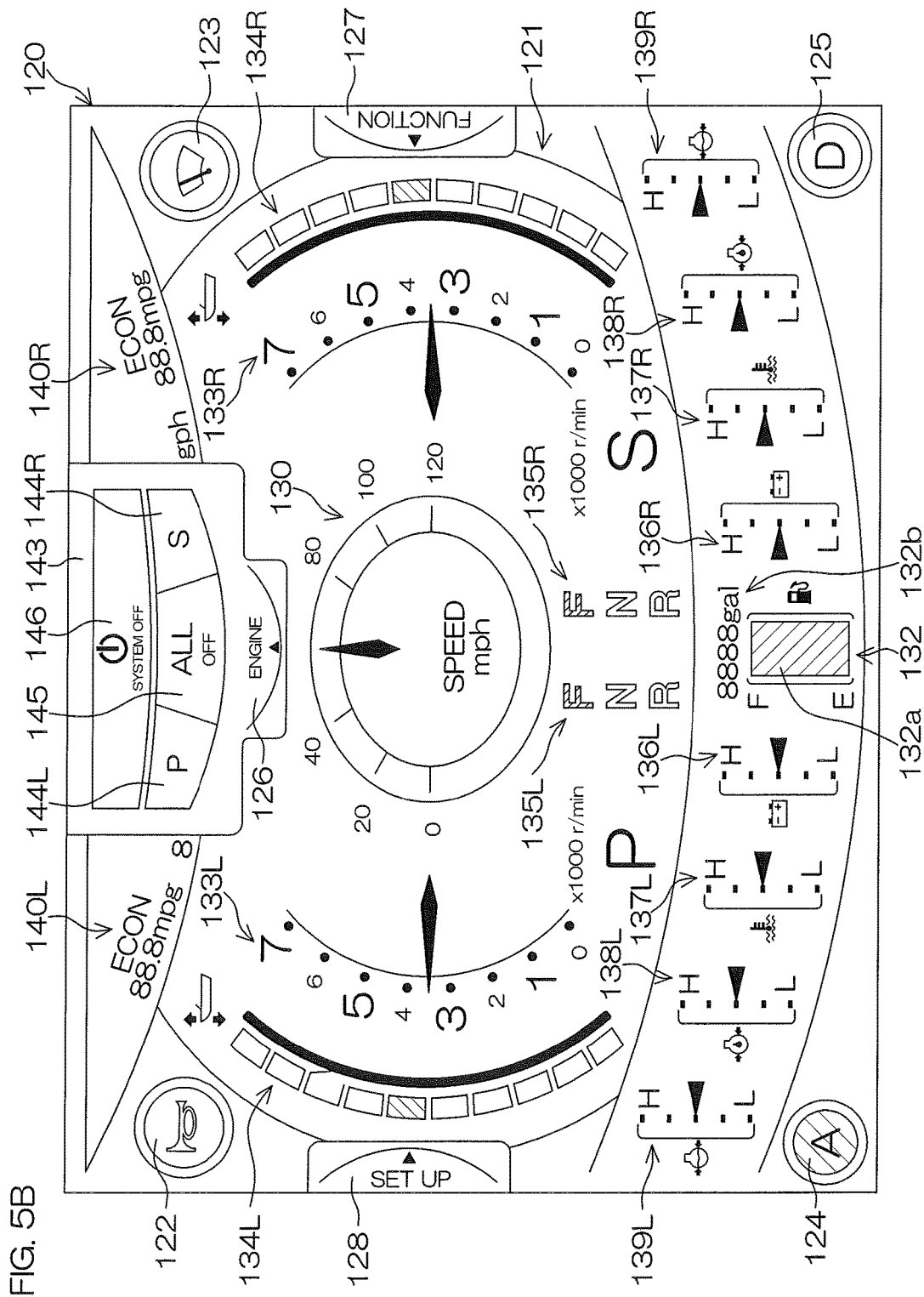
FIG. 5B shows an example of the main screen in a state where an ON/OFF panel is expanded and displayed.

The engine tab 126 is positioned at a central portion of the upper side of the main screen 120. The engine tab 126 preferably is a software key and when it is touched by the user, an ON/OFF panel 143 is drawn out and expanded in a direction from the upper side to the lower side of the main screen 120. A state in which the ON/OFF panel 143 is expanded is shown in FIG. 5B. The ON/OFF panel 143 in the expanded state includes a portside outboard motor stop switch 144L, a starboard side outboard motor stop switch 144R, an all outboard motor stop switch 145, and a system stop switch 146. The portside outboard motor stop switch 144L preferably is a software key configured to stop the engine 12 of the portside outboard motor 3L. The starboard side outboard motor stop switch 144R preferably is a software key configured to stop the engine 12 of the starboard side outboard motor 3R. The all outboard motor stop switch 145 preferably is a software key configured to stop the engines 12 of all outboard motors 3, that is, both the portside outboard motor 3L and the starboard side outboard motor 3R. The system stop switch 146 preferably is a software key configured to stop the engines 12 of all outboard motors 3 and stop the operations of all the equipment under the control of the central controller 8. The ON/OFF panel 143 may become closed when any of the switches of the ON/OFF panel 143 is operated. The ON/OFF panel 143 may also become closed by operating the engine tab 126 in the state where the ON/OFF panel 143 is expanded.

The ON/OFF panel that is expanded and displayed does not overlap with the engine speed displays 133L and 133R. The user is thus capable of operating the switches inside the ON/OFF panel 143 while checking the engine speed. Further in the example of FIG. 5B, the ON/OFF panel 143 also does not overlap with the vessel speed display 130 or the shift position displays 135L, 135R, and the user is thus able to check such information as well.

Figure 5C:
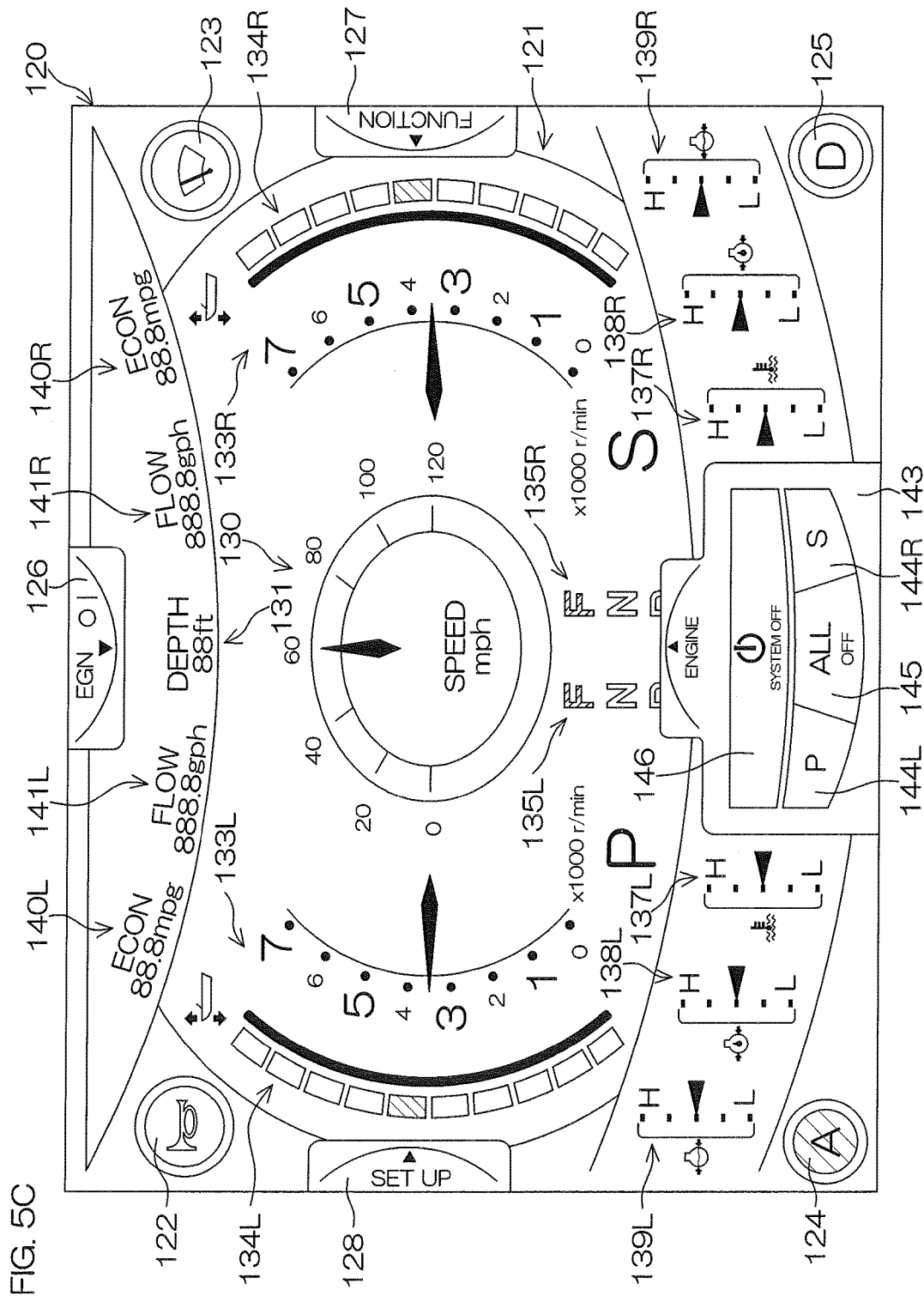
FIG. 5C shows another example of the main screen in a state where an ON/OFF panel is expanded and displayed.

In order that the displays at an upper portion of the screen do not become hidden when the ON/OFF panel 143 is expanded and displayed, the ON/OFF panel 143 may be positioned at another position, for example, a lower portion of the screen of the display device 10 as shown in FIG. 5C. It is preferable for the ON/OFF panel 143 not to be overlapped with the engine speed displays 133L, 133R in this case as well.

The function tab 127 is positioned at a central portion of the right side of the main screen 120. When a touch operation is performed on the function tab 127, the function tab 127 is drawn out toward the left side of the main screen 120. Equipment function screens 151 to 157 (see FIG. 7 to FIG. 10D) for operation, etc., of the equipment included in the small vessel 1 are thus displayed. The setup tab 128 is positioned at a central portion of the left side of the main screen 120. When a touch operation is performed on the setup tab 128, the setup tab 128 is drawn out toward the right side of the main screen 120. A setting screen 210 (see FIG. 11A to FIG. 11F) for various settings is thus displayed. The function tab 127 and the setup tab 128 preferably are software keys configured to be operated by the operator to make the equipment function screens 151 to 157 and the setting screen 210 be displayed, respectively.

The horn switch 122, the wiper switch 123, the engine tab 126, the function tab 127, the analog button 124, the digital button 125, etc., are thus provided as operation portions in the main screen 120. The vessel-related information display area 121 is also provided in the main screen 120, and the displays 130, 131, 132, 133L, 133R, 134L, 134R, 135L, 135R, 136L, 136R, 137L, 137R, 138L, 138R, 139L, 139R, 140L, 140R, 141L, and 141R related to various vessel-related information are positioned in the vessel-related information display area 121.

Figure 5D:
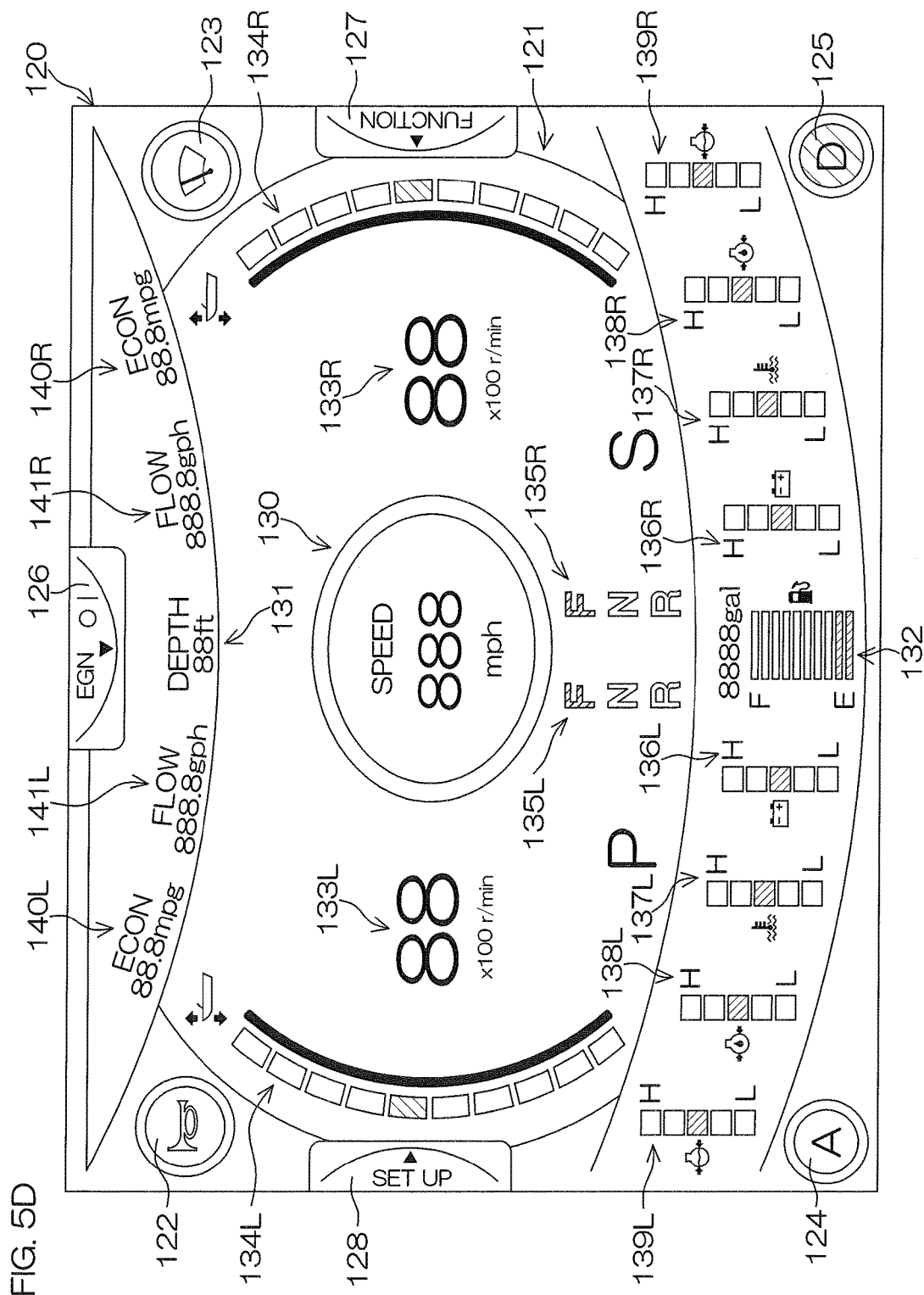
FIG. 5D shows an example of the main screen in a digital format.

FIG. 5D shows an example of the main screen 120 in the digital format. In FIG. 5D, portions corresponding to portions in FIG. 5A are provided with the same reference symbols. In the main screen 120 in the digital format, the vessel speed display 130, the engine speed displays 133L and 133R, etc., are displayed as numerical values. Also in the present example, the remaining fuel amount display 132 includes multiple rectangular or substantially rectangular segments that are positioned from an empty (E) position to a full (F) position and the remaining fuel amount is indicated by the number of lit segments that are lit up successively from the empty position. Further in the present example, each of the battery voltage displays 136L and 136R, the engine temperature displays 137L and 137R, the cooling water pressure displays 138L and 138R, and the lubricating oil pressure displays 139L and 139R is configured by arraying multiple segments in the up/down direction. The value of each is configured to be indicated by putting a single segment at the up/down direction position corresponding to the value in the lit state.

Figure 6:
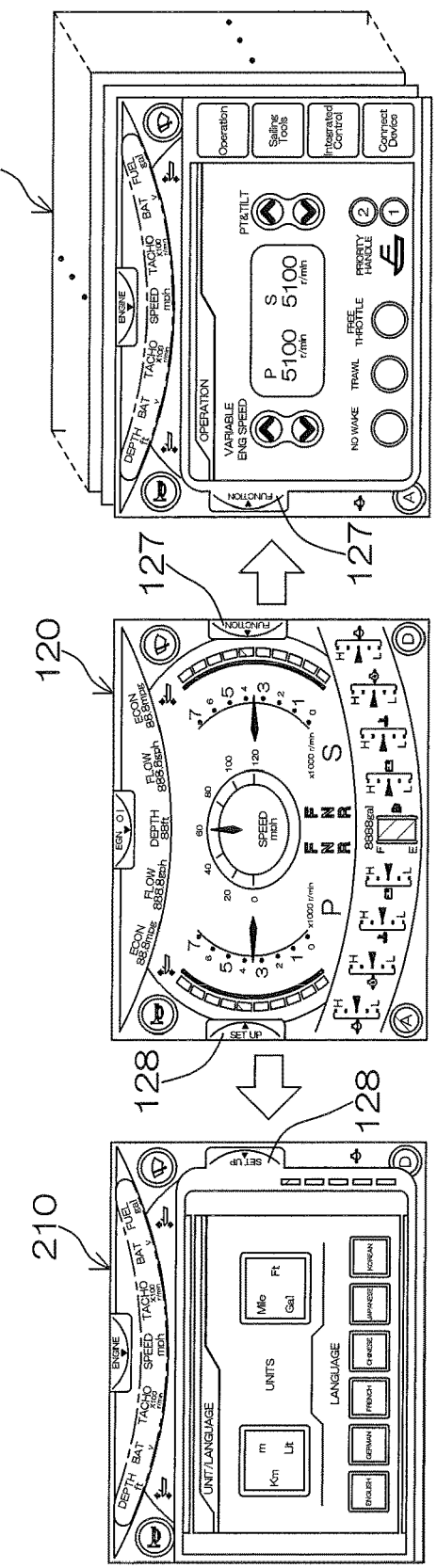
FIG. 6 is a diagram for describing a transition from the main screen to an equipment operation screen or a setting screen.

FIG. 6 is a diagram for describing a transition from the main screen 120 to the equipment operation screens 151 to 157 or the setting screen 210. When the user touches the function tab 127 in the main screen 120, the display screen of the display device 10 transitions from the main screen 120 shown at a central portion of FIG. 6 to the equipment operation screens 151 to 157 shown at the right side. When the user touches the setup tab 128 in the main screen 120, the display screen of the display device 10 transitions from the main screen 120 shown at the central portion of FIG. 6 to the setting screen 210 shown at the left side.

The engine tab 126 is preferably provided in all of the equipment operation screens 151 to 157 and the setting screen 210 and the position thereof is the same as that in the case of the main screen 120. Also in each of the equipment operation screens 151 to 157 and the setting screen 210, when the engine tab 126 is touched and the ON/OFF panel 143 is expanded, the position of the expanded ON/OFF panel 143 is the same as that in the case of the main screen 120 (see FIG. 5B and FIG. 5C).

When the function tab 127 is touched in any of the equipment operation screens 151 to 157, a return to the main screen 120 is performed. Similarly, when the setup tab 128 is touched in the setting screen 210, a return to the main screen 120 is performed.

Figure 7:
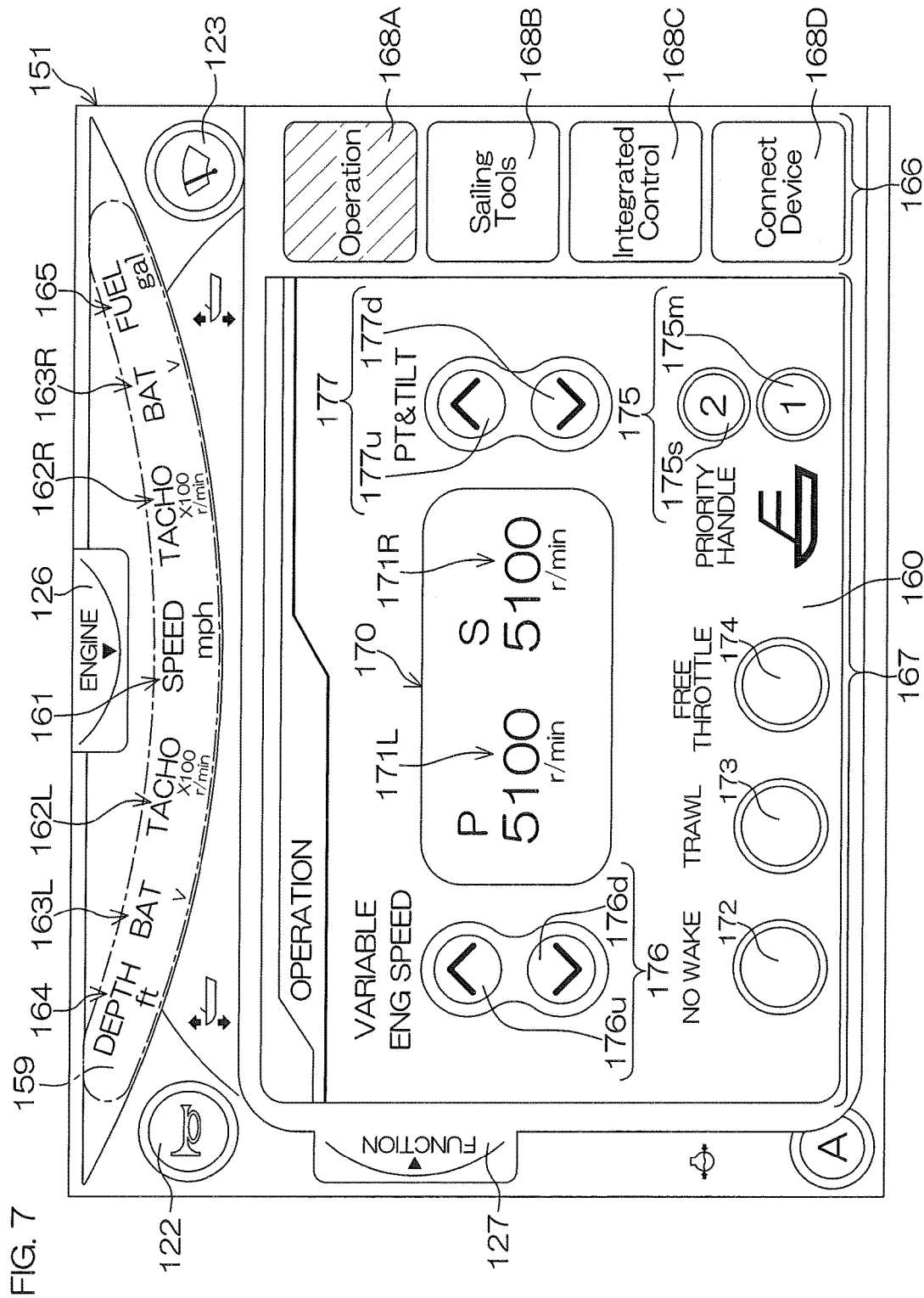
FIG. 7 shows an example of a propulsion device operation screen (equipment operation screen).

FIG. 7 shows an example of the equipment operation screen 151 that is displayed on the display device 10 when a touch operation is performed on the function tab 127 in the main screen 120. The equipment operation screen 151 has a configuration in which a function tab region 160 is displayed so as to be overlaid on or overlapping with the display of the main screen 120. However, the contents displayed in a common information region 159 positioned above the function tab region 160 in the equipment operation screen 151 differ from the contents displayed in the main screen 120. Specifically, the common information region 159 includes a vessel speed display 161, an engine speed display 162L and a battery voltage display 163L for the portside outboard motor 3L, an engine speed display 162R and a battery voltage display 163R for the starboard side outboard motor 3R, a water depth display 164, and a remaining fuel amount display 165. All of these are displayed in the digital format (numerical value format). These constitute common display information that is displayed in common in the main screen 120 and in the equipment operation screen 151. Further in the present preferred embodiment, the horn switch 122 and the wiper switch 123 are also positioned in the equipment operation screen 151 at the same positions as in the main screen 120. The operator is able to operate the switches 122 and 123 as necessary.

In the present example, the vessel speed display 161 is positioned at the center of the common information region 159, and the engine speed display 162L for the portside outboard motor 3L, the battery voltage display 163L for the portside outboard motor 3L, and the water depth display 164 are positioned successively toward the left side from the vessel speed display 161. Also, the engine speed display 162R for the starboard side outboard motor 3R, the battery voltage display 163R for the starboard side outboard motor 3R, and the remaining fuel amount display 165 are positioned successively toward the right side from the vessel speed display 161.

The function tab region 160 includes a menu button region 166 and an operation region 167. The menu button region 166 includes a plurality of menu buttons 168A, 168B, 168C, and 168D. In the present example, the plurality of menu buttons include a propulsion device operation selection button 168A, an auxiliary equipment operation selection button 168B, an integrated control operation selection button 168C, and an external equipment operation selection button 168D. The propulsion device operation screen 151 (FIG. 7), the auxiliary equipment operation screen 152 (FIG. 8), the integrated control operation screen 153 (FIG. 9), and the external equipment connection screens 154 to 157 (FIG. 10A to FIG. 10D) are configured to be displayed respectively in the function tab region 160 by operating the menu buttons 168A, 168B, 168C, and 168D, respectively. Any of the equipment operation screens 151 to 157 (for example, the propulsion device operation screen 151) may be set as an initial screen that is first displayed when the function tab 127 is touched to draw out the function tab region 160.

Although the equipment operation screens 151 to 157 differ in configuration inside the function tab region 160, the equipment operation screens 151 to 157 preferably have configurations in common in the other regions. That is, the equipment operation screens 151 to 157 include the common information region 159, the horn switch 122, the wiper switch 123, and the engine tab 126 preferably at the same positions, respectively. The positions of the respective displays inside the common information region 159 are also the same. The function tab region 160 provides functional information related to functions usable during navigation of the small vessel 1.

The propulsion device operation screen 151 (FIG. 7) includes an engine speed display portion 170 and a plurality of operation buttons 172 to 177. The engine speed display portion 170 displays the engine speeds of the respective engines of the portside outboard motor 3L and the starboard side outboard motor 3R. In the present example, the engine speed display portion 170 is positioned at the center of the function tab region 160 and the plurality of operation buttons 172 to 177 are positioned at a periphery thereof. Inside the engine speed display portion 170, an engine speed numerical display 171L for the portside outboard motor 3L is positioned at the left side and an engine speed numerical display 171R for the starboard side outboard motor 3R is positioned at the right side. The plurality of operation buttons include a no-wake button 172, a trolling button 173, a free throttle button 174, a vessel operator compartment selection button 175, engine speed variable setting buttons 176, and tilt/trim buttons 177.

The no-wake button 172 preferably is a software key that is configured to be operated to restrict the engine speeds to not more than a predetermined speed. This is used, for example, when navigating inside a harbor or other area in which a wake must not be created. By operating the no-wake button 172, the engine speeds are restricted to not more than the predetermined speed regardless of the operation amounts of the levers 7L and 7R of the remote controllers 7. The trolling button 173 preferably is a software key that is configured to set a trolling mode to perform trolling. Trolling is a form of fishing that is performed while making a vessel run slowly, and the trolling mode is a propulsion device control mode in which the small vessel 1 is made to run slowly for this purpose. In the trolling mode, the engine speed preferably is set in steps by the engine speed variable setting buttons 176. The engine speed variable setting buttons 176 include an up button 176u and a down button 176d, which preferably are software keys. By operation of the up button 176u, the engine speeds of the left and right outboard motors 3L and 3R are increased by a fixed rotational speed, and by operation of the down button 176d, the engine speeds of the left and right outboard motors 3L and 3R are decreased by a fixed rotational speed. The engine speeds during trolling is thus adjusted easily. The free throttle button 174 preferably is a software key that is configured to be operated to perform engine revving. By operating the free throttle button 174, the shift positions of the outboard motors 3 are held at the neutral positions regardless of the operation positions of the levers 7L and 7R. The vessel operator compartment selection button 175 preferably is a software key that is configured to be operated to activate one of either the main station 5M (main vessel operator compartment) or the substation 5S (sub vessel operator compartment). The vessel operator compartment selection button 175 includes a main station selection button 175m configured to enable the main station 5M and a substation selection button 175s configured to enable the substation 5S. The tilt/trim buttons 177 preferably are software keys that are configured to be operated to change the tilt angles of the outboard motors 3. The tilt/trim buttons 177 include a tilt-up key 177u and a tilt-down key 177d. When the tilt-up key 177u is operated, the tilt/trim actuator 27 is actuated to raise the propellers 13 and increase the trim angles of the outboard motors 3. When the tilt-down key 177d is operated, the tilt/trim actuator 27 is actuated to lower the propellers 13 and decrease the trim angles of the outboard motors 3.

Figure 8:
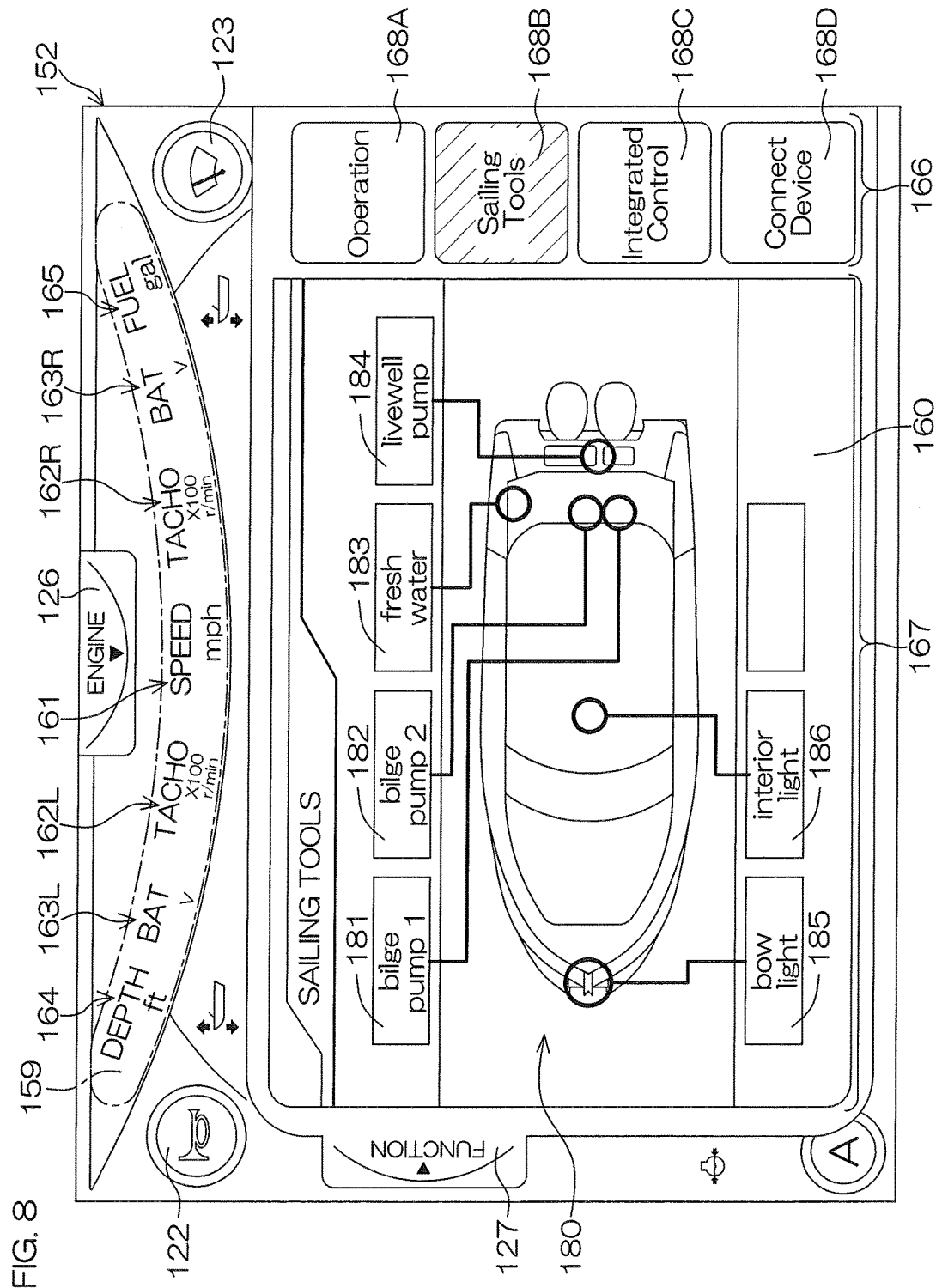
FIG. 8 shows an example of an auxiliary equipment operation screen (equipment operation screen).

FIG. 8 shows an example of the auxiliary equipment operation screen 152. The auxiliary equipment operation screen 152 is displayed by touching the auxiliary equipment operation selection button 168B displayed in the function tab region 160. The auxiliary equipment operation screen 152 includes an equipment position display portion 180, in which graphic forms expressing the positions of the various equipment provided in the small vessel 1 are displayed, and a plurality of operation buttons 181 to 186. In the present example, the equipment position display portion 180 is positioned across the entire width in the left/right direction of the center of the function tab region 160, and the plurality of operation buttons 181 to 186 are distributed above and below it. The plurality of operation buttons include a first bilge pump button 181, a second bilge pump button 182, a freshwater button 183, a livewell pump button 184, a bow light button 185, and an interior light button 186, and these are software keys. The equipment position display portion 180 includes lines joining the respective buttons 181 and 186 to circles indicating the positions of the corresponding equipment.

The first bilge pump button 181 and the second bilge pump button 182 are buttons configured to actuate and stop the first and second bilge pumps 54 respectively to discharge water, which has entered inside the vessel, to the exterior of the vessel (see FIG. 3). The freshwater button 183 is a button configured to actuate and stop the freshwater pump 65 that supplies the freshwater stored in advance inside the vessel. The livewell pump button 184 is a button configured to actuate and stop the livewell pump 55 that replaces the water in the livewell installed inside the vessel. The bow light button 185 is a button configured to turn on and off a bow light, which is lighting installed at the bow. The interior light button 186 is a button configured to turn on and off an indoor light that is an illuminating lamp installed in the cabin. The bow light and the interior light are examples of the vessel light 56.

Each of the buttons 181 to 186 is controlled to be in an active display state when the corresponding equipment is being actuated or lit and controlled to be in an inactive display state when the corresponding equipment is stopped or unlit. The active display state and the inactive display state are distinguished by coloring and displaying each button in different colors.

Figure 9:
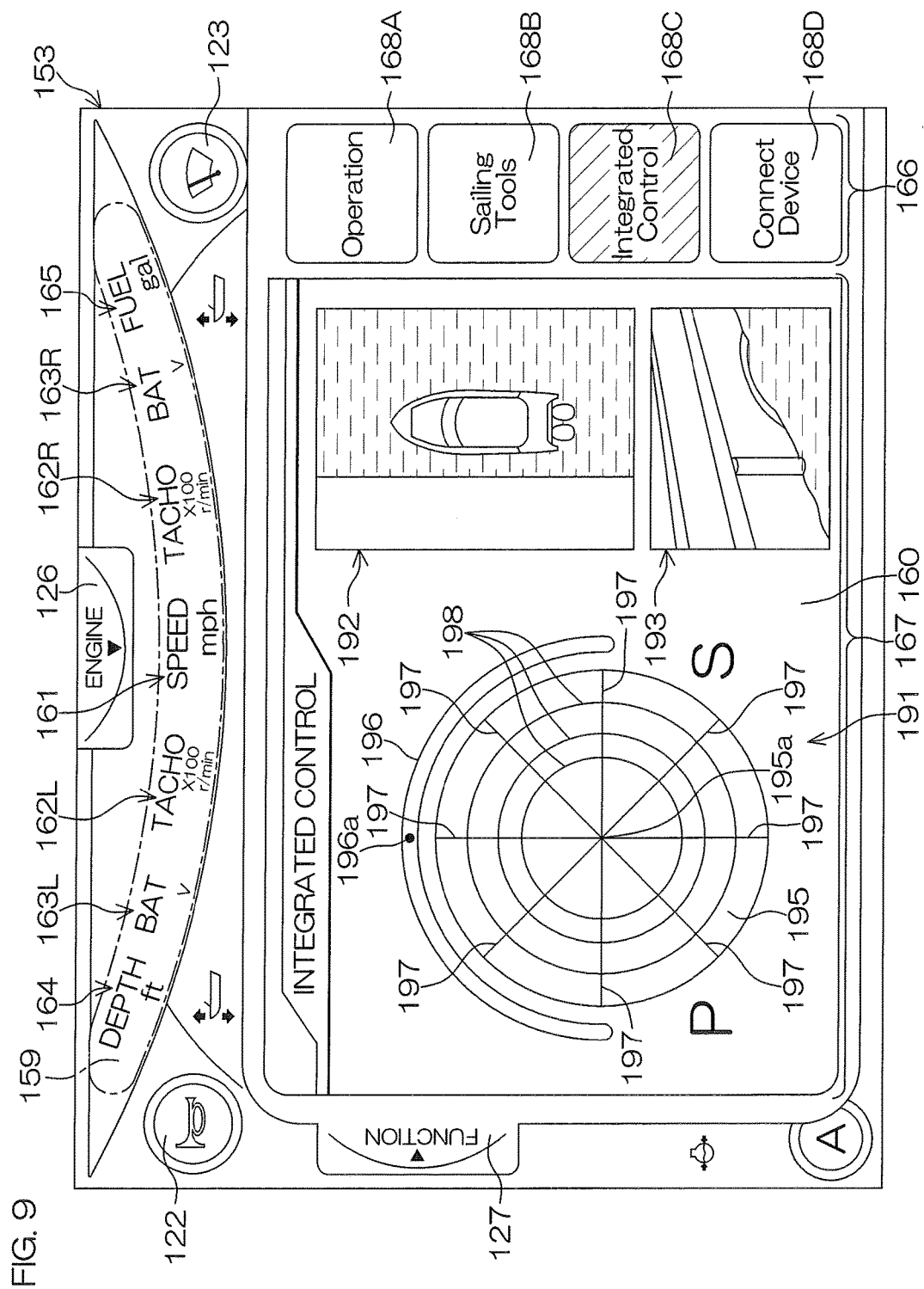
FIG. 9 shows an example of an integrated control operation screen (equipment operation screen).

FIG. 9 shows an example of the integrated control operation screen 153. The integrated control operation screen 153 is displayed by operating the integrated control operation selection button 168C inside the function tab region 160. The integrated control operation selection button 168C is mainly operated during docking or leaving shore, etc. The integrated control operation screen 153 includes an image display portion 190 that performs image display of the circumstances of a periphery of the small vessel 1 and an operation portion 191 configured or programmed to control the propulsion devices (outboard motors).

In the present example, the image display portion 190 includes a plan view image 192 (so-called around view) of an area including the small vessel 1 and its periphery, and a camera image 193 being taken by a camera (for example, the rear camera 58A) included in the small vessel 1.

The operation portion 191 includes a movement commanding portion 195 preferably with a circular or substantially circular shape and a turning commanding portion 196 with an arcuate shape extending along the movement commanding portion 195. The movement commanding portion 195 includes direction guide lines 197 extending radially at equiangular intervals from a center 195a and speed guide lines 198 that are arranged concentrically. When a touch operation is performed on the movement commanding portion 195, the direction of the touch operation position with respect to the center 195a of the movement commanding portion 195 is set as a target direction. Also, a target speed is set in accordance with the distance from the center 195a of the movement commanding portion 195. The engine speeds and steering angles of the outboard motors 3 are controlled so that the small vessel 1 moves in the target direction at the target speed. Further, when a touch operation is performed on the turning commanding portion 196, a turning target speed and a turning direction are set in accordance with the touch position. Specifically, the turning direction is set to the left direction or the right direction according to whether the touch operation position is at the left side or the right side with respect to a center position 196a of the turning commanding portion 196. Further, the turning speed is set in accordance with the distance between the center position 196a and the touch operation position (distance along the arcuate turning commanding portion

196). The outboard motors 3 are controlled so that the small vessel 1 turns in the turning direction at the turning speed.

The vessel operator operates the movement commanding portion 195 and the turning commanding portion 196 while referencing the display of the image display portion 190 as necessary. Vessel maneuvering for leaving shore or docking, etc., is thus performed by making the small vessel 1 move or turn.

FIG. 10A to FIG. 10D show an example of the external equipment connection screens. The external equipment connection screens 154 to 157 are displayed by operating the external equipment operation selection button 168D inside the function tab region 160. Each of the external equipment connection screens 154 to 157 includes a display portion 200 that displays an image related to an external equipment, and a plurality of external equipment selection buttons 201 to 204 that are used to select the external equipment. In the present example, the plurality of external equipment selection buttons include a fishfinder selection button 201, a cellphone selection button 202, a camera selection button 203, and an audio device selection button 204.

Figure 10A:
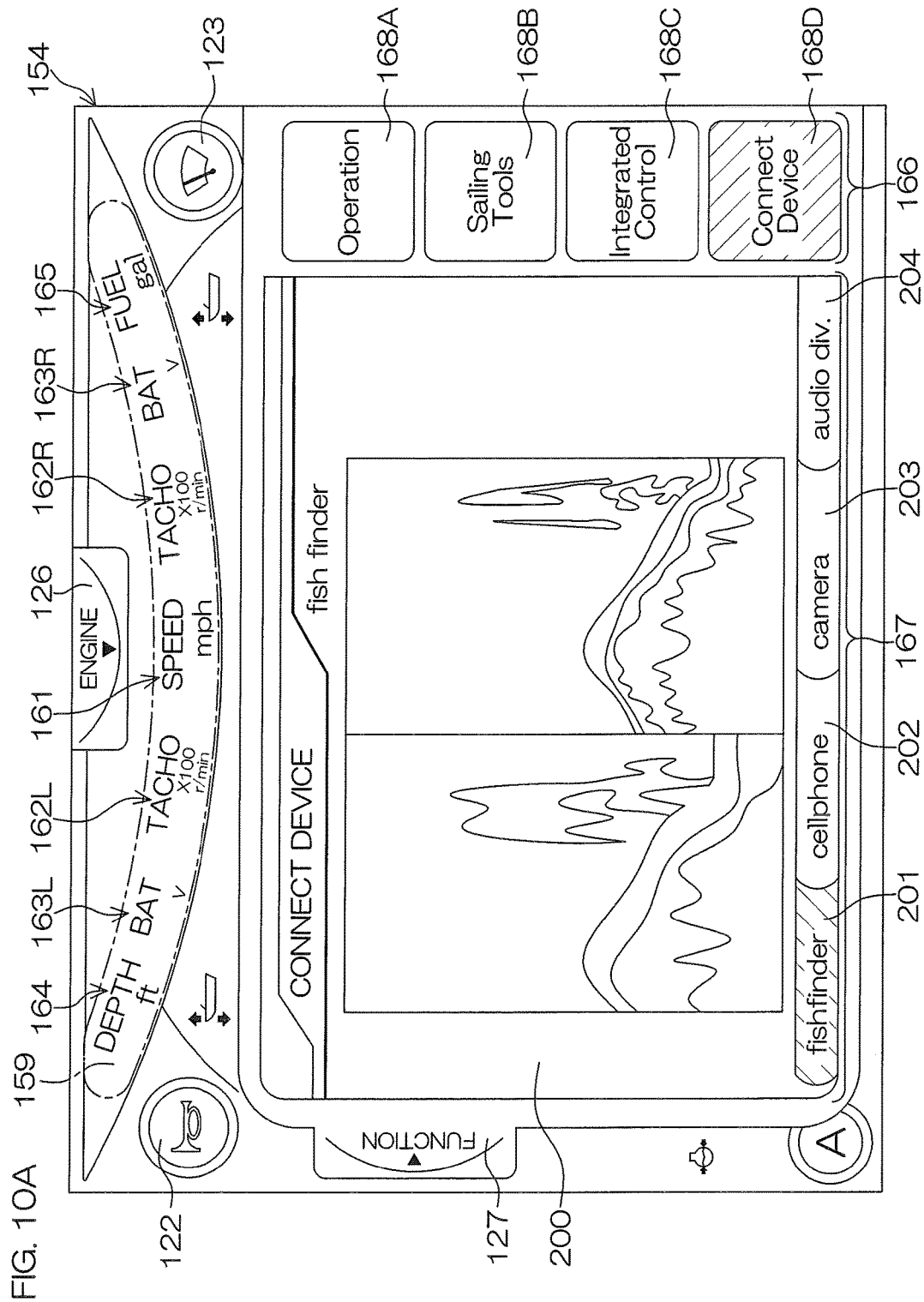
FIG. 10A shows an example of an external equipment connection screen (equipment operation screen).
Figure 10B:
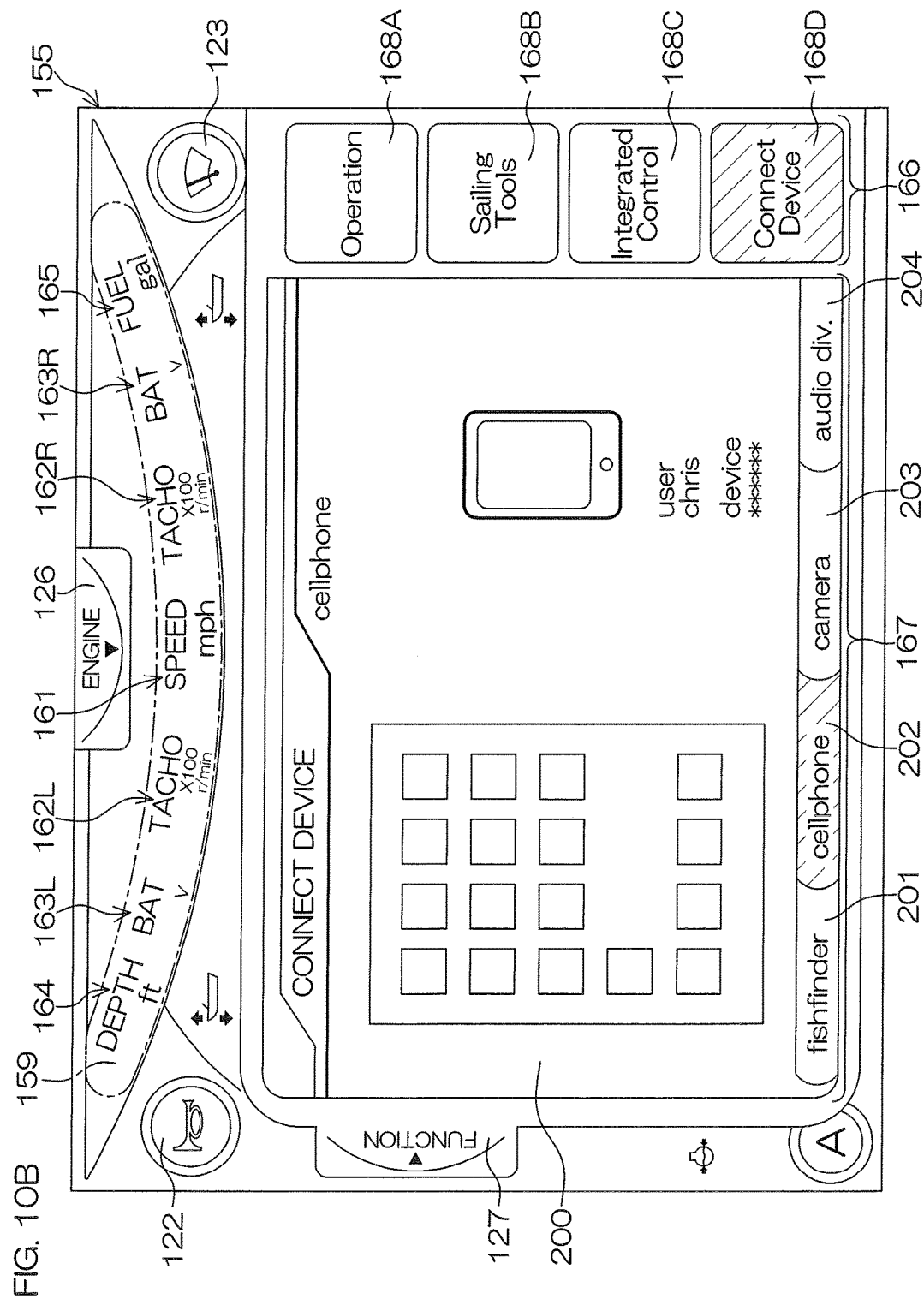
FIG. 10B shows an example of the external equipment connection screen (equipment operation screen).
Figure 10C:
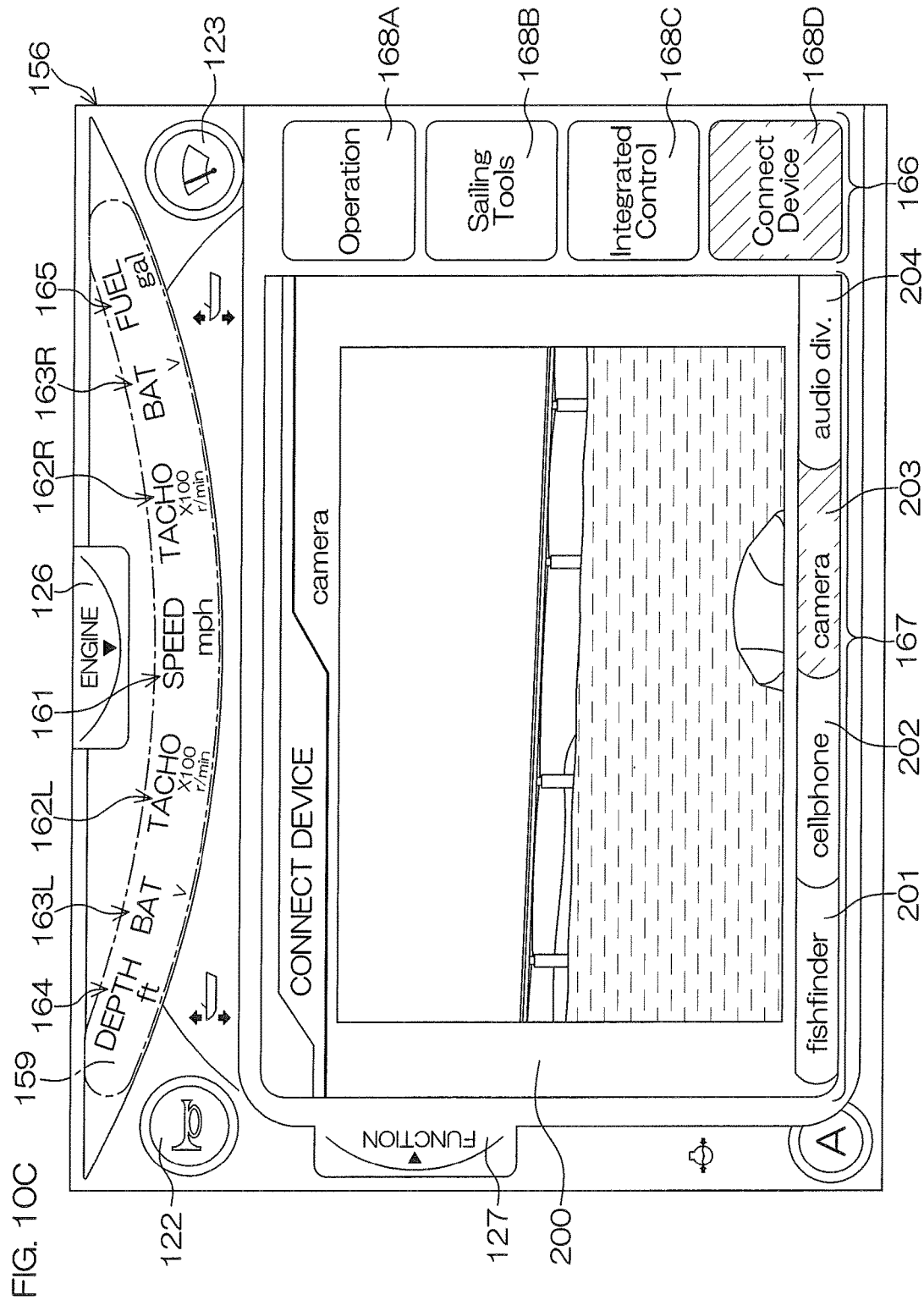
FIG. 10C shows an example of the external equipment connection screen (equipment operation screen).
Figure 10D:
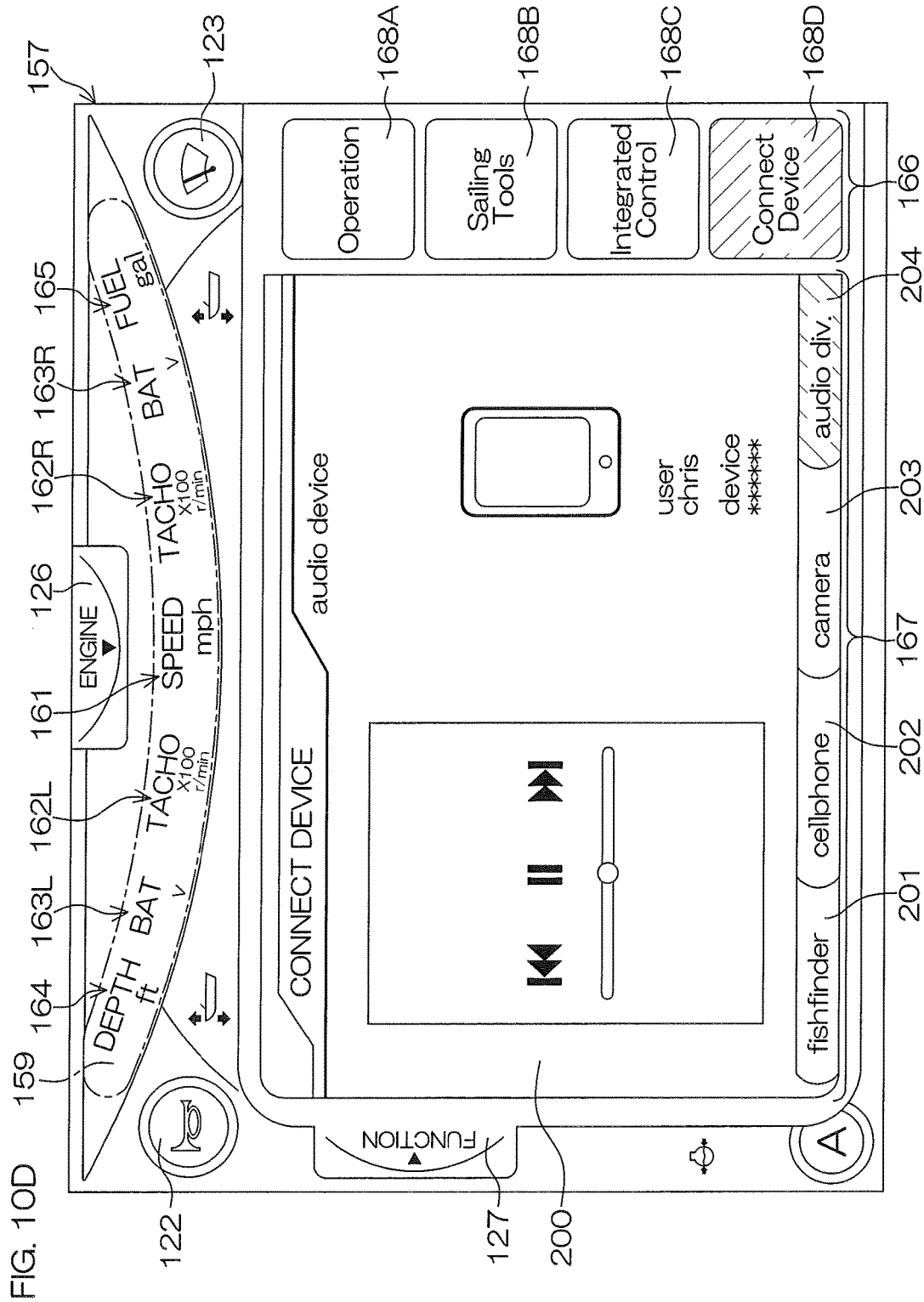
FIG. 10D shows an example of the external equipment connection screen (equipment operation screen).

As shown in FIG. 10A, the fishfinder selection button 201 is a button by which image data output by the sonar 53 or other fish finder are displayed in the display portion 200. As shown in FIG. 10B, the cellphone selection button 202 is a button by which a screen and other information of a cellphone (a smartphone, in particular) are displayed in the display portion 200. As shown in FIG. 10C, the camera selection button 203 is a button by which image data output by the camera 58 (for example, the rear camera 58A), included in the small vessel 1, are displayed in the display portion 200. As shown in FIG. 10D, the audio device selection button 204 is a button by which a display screen and other information of the audio device 75 are displayed in the display portion 200. Each of the external equipment selection buttons 201 to 204 is controlled to be in an active display state when the corresponding external equipment is in a selected state and controlled to be in an inactive display state when the corresponding external equipment is in an unselected state. The active display state and the inactive display state are distinguished by coloring and displaying each button in different colors.

FIG. 11A to FIG. 11F show examples of the setting screen 210 displayed on the display device 10 when a touch operation is performed on the setup tab 128 in the main screen 120. The setting screen 210 has a configuration where a setup tab region 211 preferably is displayed so as to be overlaid on or overlapped with the display of the main screen 120. However, as in the equipment operation screens 151 to 157 (see FIG. 7), the contents displayed in a common information region 212 positioned above the setup tab region 211 differ from the contents displayed in the main screen 120. In the present example, the display of the common information region 212 is the same as the display of the common information region 159 of the equipment operation screens 151 to 157. Specifically, as in the case of FIG. 7, etc., the common information region 212 includes the vessel speed display 161, the engine speed display 162L and the battery voltage display 163L for the portside outboard motor 3L, the engine speed display 162R and the battery voltage display 163R for the starboard side outboard motor 3R, the water depth display 164, and the remaining fuel amount display 165. The positions and display modes of these are the same as those in the case of FIG. 7, etc., and therefore description thereof shall be omitted. The horn switch 122, the wiper switch 123, and the engine tab 126 are also positioned in the setting screen 210 at the same positions as in the main screen 120. These points are the same as the equipment operation screens shown in FIG. 7, etc., as well. The operator is thus able to operate the horn switch 122 or the wiper switch 123 as necessary to actuate the horn 52 or the wiper 51 even when the setting screen 210 is being displayed on the display device 10. Also, the engine tab 126 is configured to be operated to make the ON/OFF panel 143 be displayed.

The setup tab region 211 provides an interface related to a various setting function, which is an example of functions usable during navigation of the small vessel 1. A setting region image 213 inside the setup tab region 211 is configured to be scrolled up or down using the touch panel function to display a plurality of pages. Various settings are thus able to be set. The setup tab region 211 is provided with a page position display portion 209 that indicates the displayed page position of the setting region image 213. In the present example, the page position display portion 209 is positioned at the right end of the setup tab region 211 and is configured by arraying multiple rectangular segments in the up/down direction. The displayed page position is expressed by a segment corresponding to the displayed position being put in a lit display state.

When the setup tab 128 is touched, the setup tab region 211 closes and a transition to the main screen 120 is performed.

Figure 11A:
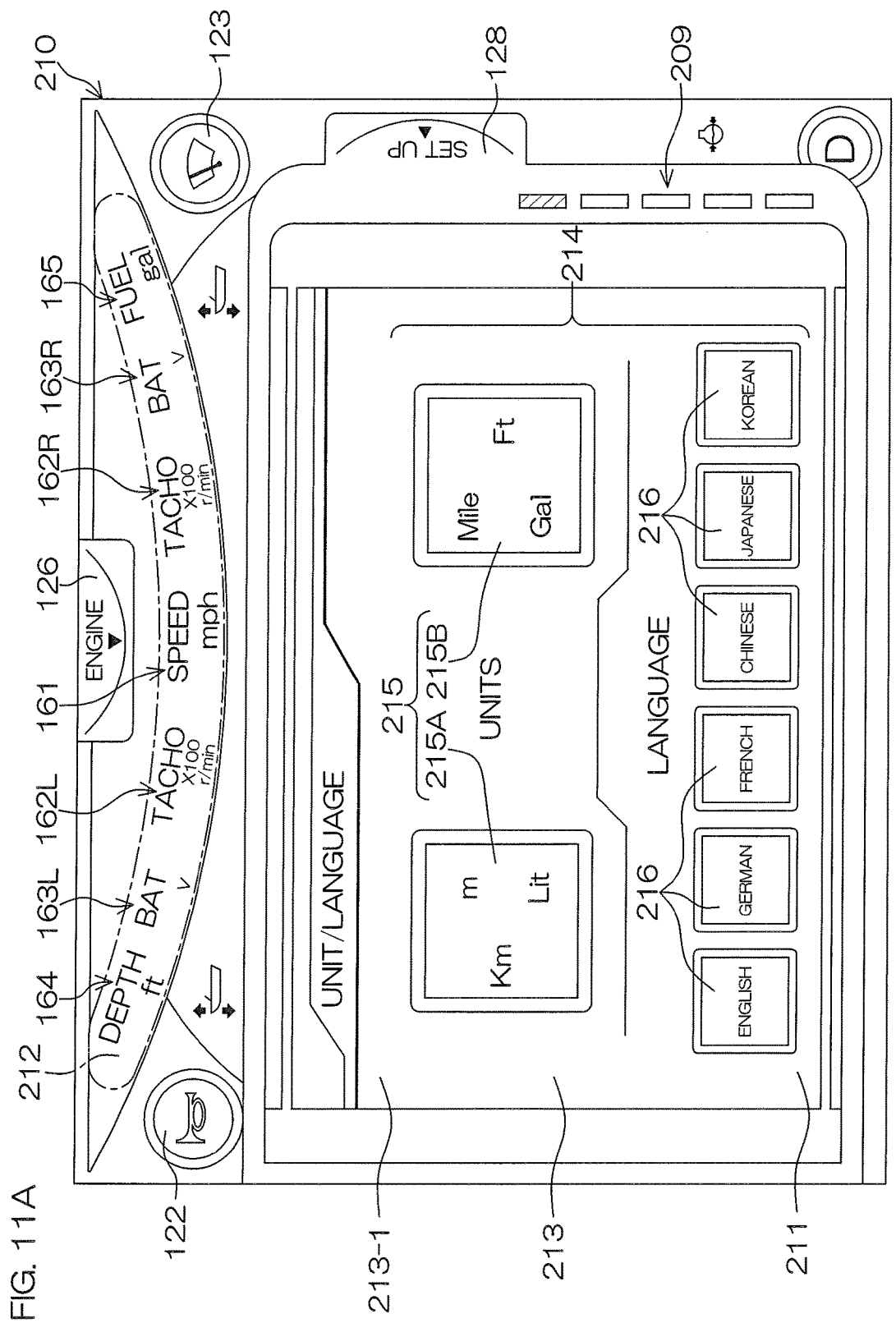
FIG. 11A shows a page of the setting screen.

FIG. 11A shows a state in which a unit/language selection page 213-1, included in the setting region image 213 displayed in the setup tab region 211, is displayed. The unit/language selection page 213-1 includes an operation portion 214 that includes unit selection buttons 215 and language selection buttons 216. The unit selection buttons 215 preferably are software keys configured to be used to select the system of units of the numerical values displayed in the main screen 120, etc. In the present example, the unit selection buttons 215 include a first unit system selection button 215A configured to select a kilometer, meter, and liter combination and a second unit system selection button 215B configured to select a feet, mile, and gallon combination. The language selection buttons 216 preferably are software keys that are configured to be used to select the language of the terms displayed in the main screen 120, etc. In the present example, the language selection buttons 216 include a plurality of buttons for respectively selecting English, German, French, Chinese, Japanese, and Korean.

Figure 11B:
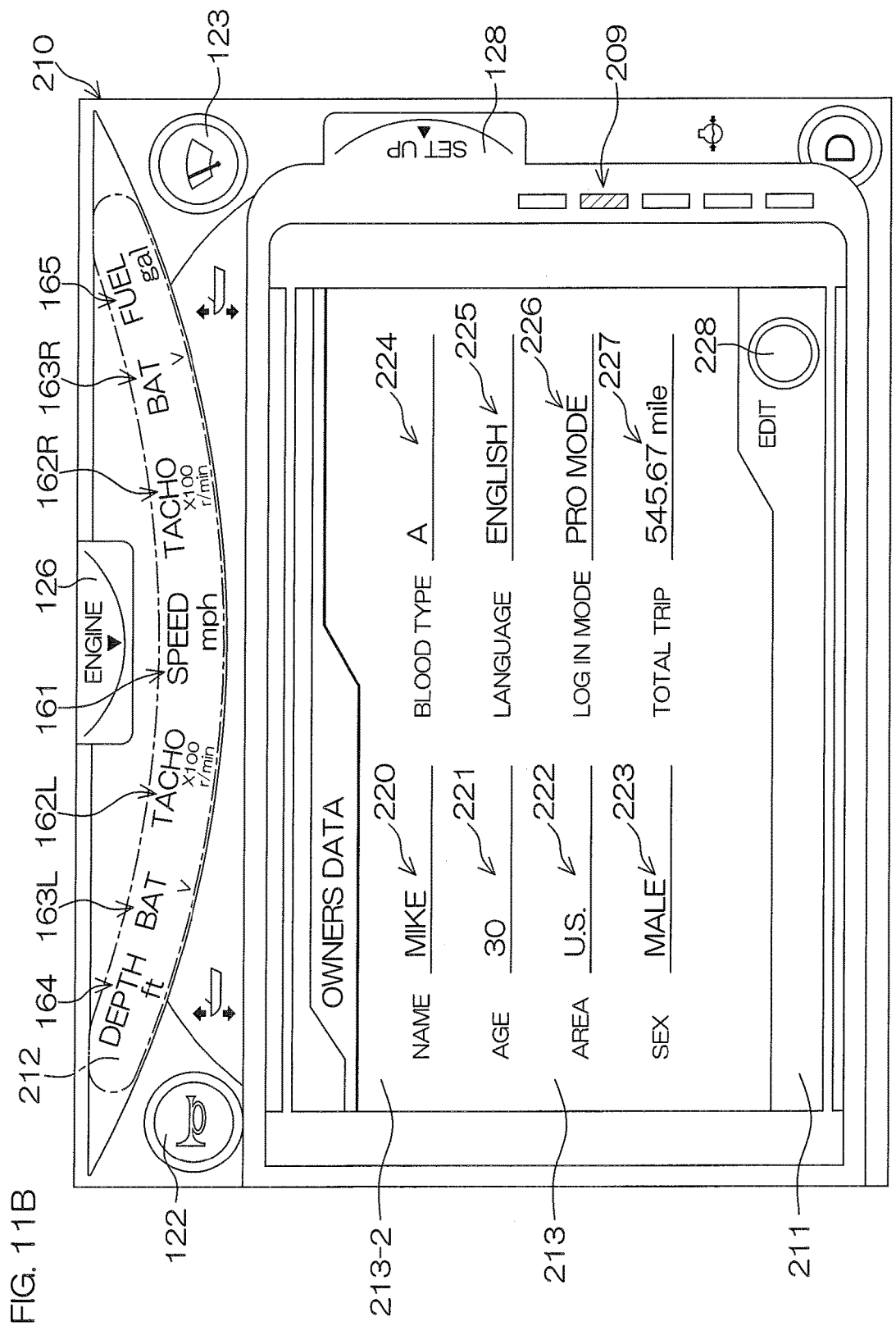
FIG. 11B shows another page of the setting screen.

FIG. 11B shows a state in which a user information setting page 213-2, included in the setting region image 213, is displayed. The user information setting page 213-2 is a page in which information on the user are displayed and edited as necessary. The user information setting page includes respective fields of user's name 220, age 221, residence 222, sex 223, blood type 224, language used 225, log-in mode 226, and trip distance 227. Entries in the fields besides the log-in mode 226 and the trip distance 227 can be edited as necessary by operating an edit button 228, which preferably is a software key.

Figure 11C:
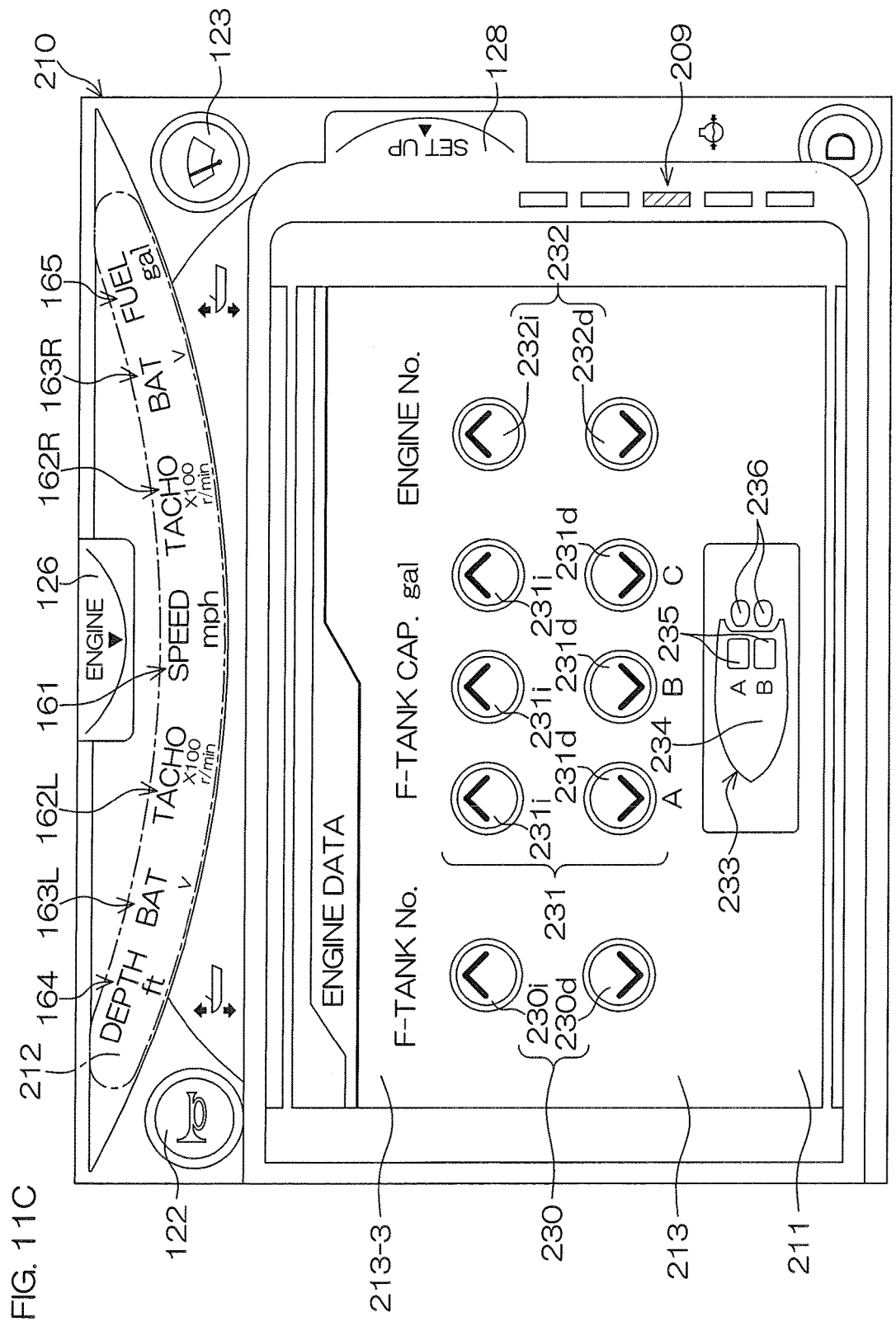
FIG. 11C shows yet another page of the setting screen.

FIG. 11C shows a state in which an outboard motor data setting page 213-3, included in the setting region image 213, is displayed. The outboard motor data setting page 213-3 includes fuel tank number setting buttons 230, fuel tank capacity setting buttons 231, outboard motor number setting buttons 232, and a vessel graphic display portion 233 that displays a flat graphic form of the vessel. The fuel tank number setting buttons 230 preferably are software keys configured to set the number of fuel tanks installed in the small vessel 1. The fuel tank number setting buttons 230 include an increment button 230*i* and a decrement button 230*d* and the number of fuel tanks are set upon being incremented or decremented by operation of the buttons 230*i* and 230*d*. In the present preferred embodiment, one to three fuel tanks A, B, and C are capable of being set, for example. The fuel tank capacity setting buttons 231 preferably are software keys configured to set the tank capacities of the respective fuel tanks A, B, and C. The fuel tank capacity setting buttons 231 include an increment button 231*i* and a decrement button 231*d* for each of the tanks A, B, and C in accordance with the number of tanks that can be set. The tank capacity of each of the fuel tanks A, B, and C is set by operating the buttons 231*i* and 231*d*. The outboard motor number setting buttons 232 preferably are software keys configured to set the number of outboard motors 3 installed in the small vessel 1. The outboard motor number setting buttons 232 include an increment button 232*i* and a decrement button 232*d*. The number of outboard motors are set upon being incremented or decremented by operation of the buttons 232*i* and 232*d*. The vessel graphic forms displayed in the vessel graphic display portion 233 include a simplified graphic form 234 of the hull, simplified graphic forms 235 of the fuel tanks of the number that has been set, and simplified graphic forms 236 of the outboard motors of the number that has been set. The operator is able to set and register the number of fuel tanks, the number of outboard motors, etc., while referencing the display in the vessel graphic display portion 233.

FIG. 11D shows a state in which an externally connected equipment setting page 213-4, included in the setting region image 213, is displayed. The externally connected equipment setting page 213-4 is a page configured to set and register connectable externally connected equipment. In the present example, a case where a cellphone, a camera, a fishfinder, and a surrounding image taking device preferably are registered as the externally connected device is illustrated. Accordingly, a cellphone name edit button 240, a camera name edit button 241, a fishfinder name edit button 242, and a surrounding image taking device name edit button 243 are provided. The buttons 240 to 243 preferably are software keys that are configured to be operated using the touch panel 10A. By operation of the buttons 240 to 243, the names of the externally connected equipment of the respective categories are capable of being registered.

FIG. 11E shows a state in which a self-diagnostic data page 213-5, included in the setting region image 213, is displayed. The self-diagnostic data page 213-5 includes a table 250 of self-diagnostic data collected using a self-diagnosis function provided in the engine ECUs included in the outboard motors 3. The self-diagnostic data table 250 includes the respective columns of diagnosed equipment name 251, diagnosed equipment identification code 252, and diagnosed equipment fault state 253. The columns of the diagnosed equipment fault state 253 of the same number as the number of outboard motors 3 installed in the small vessel 1 are provided, and the fault state of the diagnosed equipment of each outboard motor 3 is entered in the corresponding column of the table.

Figure 11F:
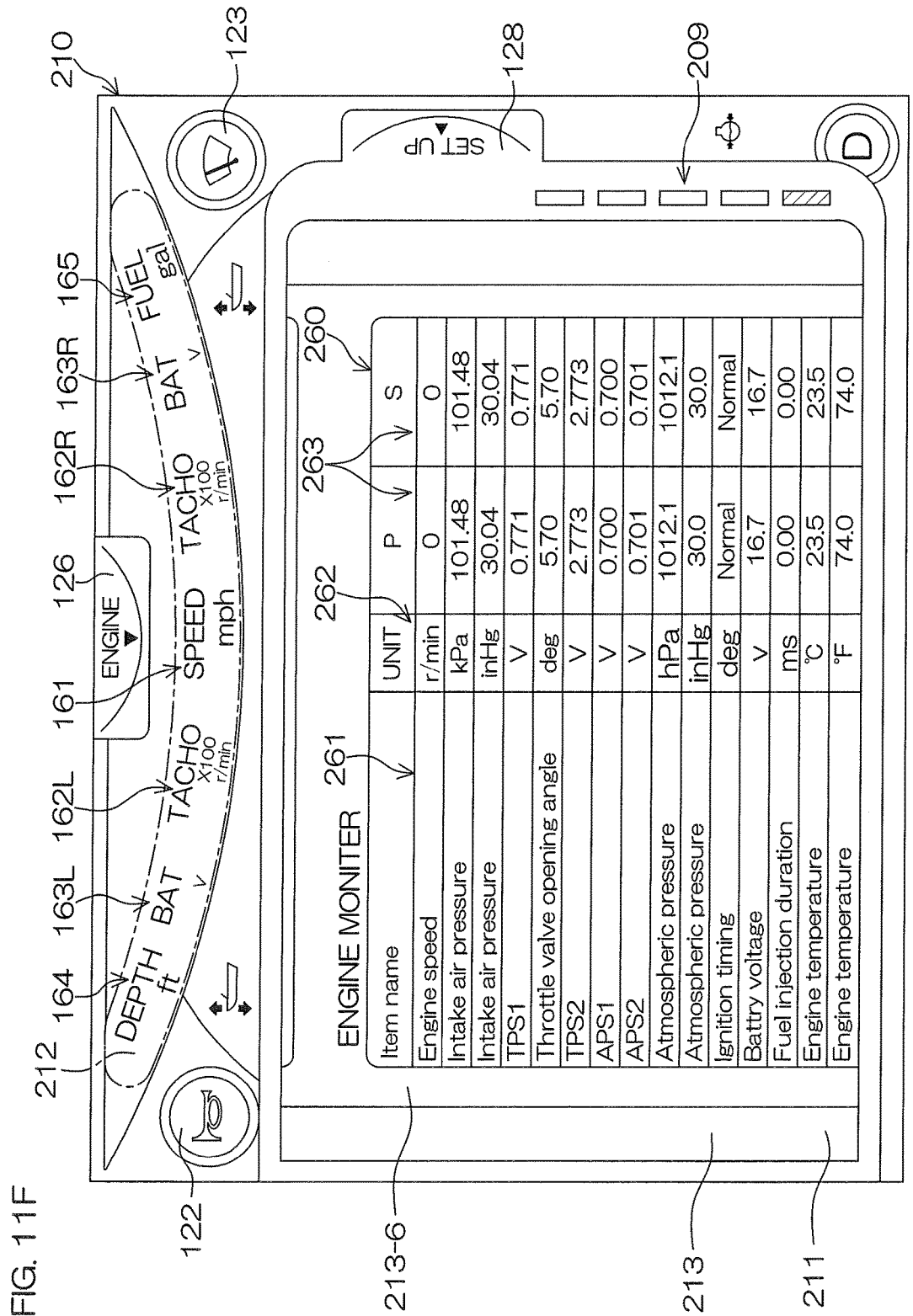
FIG. 11F shows yet another page of the setting screen.

FIG. 11F shows a state in which an engine state page 213-6, included in the setting region image 213, is displayed. The engine state page 213-6 is prepared by collection of engine state data monitored by the engine ECUs of the outboard motors 3 and includes a table 260 in which the engine state data are entered. The engine state data table 260 includes the respective columns of monitored item name 261, unit 262, and detected numerical value 263. The numerical value 263 columns of the same number as the number of outboard motors 3 are provided, and the corresponding numerical value of the monitored item is entered for each outboard motor 3.

As described above, with the present preferred embodiment, a plurality of screens are displayed in a switching or alternating manner on the display device 10 and a plurality of functions are thus be integrated in the display device 10 to simplify the layout around the vessel operator compartment. On the other hand, the vessel speed, the surrounding water depth, the remaining fuel amount, the engine speeds of the outboard motors, the trim angles of the outboard motors, the shift positions of the outboard motors, the battery voltages of the outboard motors, the engine temperatures of the outboard motors, the cooling water pressures of the outboard motors, the lubricating oil pressures of the outboard motors, the fuel economies of the outboard motors, and the fuel flow rates of the outboard motors, for example, are preferably displayed as the vessel-related information related to the navigation of the small vessel 1 in the main screen 120. Of the vessel-related information, the vessel speed, the water depth, the remaining fuel amount, the engine speeds of the outboard motors, and the battery voltages of the outboard motors constitute the common display information that is also displayed in common in screens besides the main screen 120. That is, with the present preferred embodiment, the common display information preferably is displayed on the display device 10 even when a transition from the main screen 120 to any screen among the equipment operation screens 151 to 157 and the setting screen 210 is performed. The common display information is thus capable of being provided to the user in any of the screens, therefore enabling the providing of the vessel display system which achieves both integration of a plurality of functions and good viewability of information.

Also with the present preferred embodiment, the common display information includes the engine speeds as output information of the outboard motors 3. Therefore, even when any of the equipment operation screens 151 to 157 and the setting screen 210 is being displayed, the user is able to know the output information of the outboard motors 3 without having to switch to the main screen 120. Also with the present preferred embodiment, displays of the vessel speed, the water depth, and the remaining fuel (remaining amount of consumable energy) are preferably included in the common display information. The user is thus able to obtain this information without switching to the main screen 120 even when any of the equipment operation screens 151 to 157 and the setting screen 210 is being displayed.

The equipment operation screens 151 to 157 preferably include the buttons 168A to 168D, 172 to 177, 181 to 186, 195, and 201 to 204 as operation keys operable by the operator. The operator is able to operate these buttons to select a function to be operated and perform equipment operation for the function. The common display information is displayed in the equipment operation screens 151 to 157 and the operator is thus able to obtain the necessary vessel-related information even while performing operation of the equipment. Also, the setting screen 210 includes the buttons 215, 216, 228, 230 to 232, and 240 to 243 as operation keys (setting keys) operable by the operator. The operator is thus able to perform input of the necessary settings by operating these buttons. The common display information is displayed in the setting screen 210 and the operator is thus able to obtain the necessary vessel-related information even while performing the setting input operations. The vessel display system, which integrates the setting information input function in the display device 10 and is excellent in viewability of information, is thus provided.

Also with the present preferred embodiment, the equipment operation screens 151 to 157 are preferably provided with the menu buttons 168A to 168D as menu keys. Any of the plurality of functions is thus able to be selected and started by operation of the menu buttons 168A to 168D. Multiple functions are thus capable of being integrated to enable the providing of the vessel display system which achieve both the integration of multiple functions and good viewability of information.

Also, vessel maneuvering input functions, by which inputs used to control the movement of the small vessel 1 are received, are provided in the propulsion device operation screen 151 and the integrated control operation screen 153. Operations to control the movement of the small vessel 1 are thus capable of being performed by performing operations on the touch panel 10A. In this process, the common display information is displayed in the propulsion device operation screen 151 and the integrated control operation screen 153 and the user can thus perform the operations for movement of the small vessel 1 while being provided with the common display information. The vessel display system, which integrates the functions for vessel maneuvering and is excellent in viewability of information, is thus provided. Also, principal equipment control input functions, related to the propulsion devices (outboard motors 3) that are the principal equipment of the small vessel 1, are preferably provided in the propulsion device operation screen 151 and the integrated control operation screen 153. The user is thus able to perform input operations to control the principal equipment while checking the common display information. Here, the principal equipment includes equipment necessary to run or operate the small vessel 1 and are mainly equipment related to propulsive force generation and steering.

Also, auxiliary equipment control input functions, by which inputs used to control the auxiliary equipment (equipment besides the principal equipment) included in the small vessel 1 are received, are provided in the auxiliary equipment operation screen 152. With this configuration, the auxiliary equipment included in the small vessel 1 is capable of being controlled by input operations at the auxiliary equipment operation screen 152. The common display information is displayed in the auxiliary equipment operation screen 152 and the user is thus capable of performing the input operations to control the auxiliary equipment included in the small vessel 1 while being provided with the common display information.

Also with the present preferred embodiment, the common display information is preferably displayed in the upper region of each of the equipment operation screens 151 to 157 and the setting screen 210 and the display related to the principal function that is to be provided in each screen is positioned at the central region of each screen. Moreover, the common information region 159 or 212, in which the common display information is displayed, is narrower than the remaining region. The common display information is thus capable of being provided without inhibiting the function of each screen.

Also with the present preferred embodiment, the main screen 120 includes the engine tab 126, the function tab 127, the setup tab 128, etc., as operation portions that accepts the operation of the operator. The main screen 120 is configured so that the vessel-related information display area 121 is wider than the display region for the operation portion. The vessel-related information is thus provided with good viewability in the main screen 120.

Also, the menu screen 120 preferably is displayed in the analog format and in the digital format. In particular, in the case of the display in the analog format, an intuitive display of the vessel-related information is made possible. On the other hand, in each of the equipment operation screens 151 to 157 and the setting screen 210, the common display information is displayed in the digital format. The common display information is thus displayed in a small display region and the common display information is thus displayed without inhibiting the display for the principal function in each screen.

Also with the present preferred embodiment, the horn switch 122 and the wiper switch 123 preferably are displayed in common in the main screen 120, the equipment operation screens 151 to 157, and the setting screen 210. That is, the switches 122 and 123 are both common operation keys that are provided in all of the screens. The user is thus able to operate the common operation keys in any of the screen displays.

Also with the present preferred embodiment, the engine tab 126 preferably is provided in common in all of the main screen 120, the equipment operation screens 151 to 157, and the setting screen 210. The user is thus able to immediately perform operations to stop the outboard motors 3 and stop the system when any of the screens is being displayed.

Although various preferred embodiments of the present invention have been described above, the present invention may be implemented in yet other preferred embodiments as will be described below.

With the preferred embodiments described above, an example where three or more screens preferably are displayed in a switching or alternating manner on the display device 10 was described. However, the present invention is applicable to a case where at least two screens are provided and it suffices that at least a portion of the vessel-related information be displayed in common as the common display information in the screens. The main screen 120 in the present preferred embodiment does not have to be considered to be the "first screen" according to various preferred embodiments of the present invention and any one of the equipment operation screens 151 to 157 and the setting screen 210 may be considered to be the "first screen" and the other screens may be considered to be the "second screens."

With the preferred embodiments of the present invention, the common information region 159 or 212 preferably is positioned at the upper portion of the screen. However, as long as the common information region is positioned at a peripheral edge region of the screen, the central region of the screen is capable of being used for the principal function of the screen. Specifically, the common information region is able to be displayed at a lower portion, a right portion, or a left portion of the screen, for example.

With the preferred embodiments of the present invention, each of the equipment operation screens 151 to 157 preferably is configured such that the display inside the function tab region 160 is switched by operation of any of the menu buttons 168A to 168D and the external equipment selection buttons 201 to 204. However, the configuration may be such that the display of the screen is switched by scrolling as in the display of the setup tab region 211. Oppositely, the display of the setup tab region 211 may be configured to be switched by operation of an operation button. Also, the direction of scrolling is not restricted to the up/down direction and may be the left/right direction instead.

With the preferred embodiments of the present invention, the transition from the main screen 120 to an equipment operation screen or the setting screen preferably is performed by performing the touch operation on the function tab 127 or the setup tab 128 displayed in the main screen 120. However, the configuration is not restricted to a touch operation and may be such that the transition from the main screen to an equipment operation screen or the setting screen is performed by performing a scroll operation instead. For example, a configuration is possible where a transition to an equipment operation screen is performed when the main screen 120 is scrolled to one of either the left or right side and a transition to the setting screen is performed when the main screen 120 is scrolled to the other of either the left or right side. Also, besides an operation of touching a tab, a configuration may be provided so that an operation of drawing out a tab (drag operation) is performed to transition to the corresponding screen.

With the preferred embodiments of the present invention, each of the function tab region 160 and the setup tab region 211 preferably is expanded widely in the central region of the screen of the display device 10. However, for example, the function tab region 160 may be set so as not to cover at least the engine speed display of one of the outboard motors in the main screen 120 (for example, the engine speed display 133L for the portside outboard motor 3L). Specifically, each equipment operation screen may be configured with the function tab region 160 being positioned in a region taking up approximately the right half of the main screen 120. The user is thus enabled to see the engine speed display 133L for the portside outboard motor 3L even when the function tab region 160 is being displayed. Similarly, the setup tab region 211 may be set so as not to cover at least the engine speed display of one of the outboard motors in the main screen 120 (for example, the engine speed display 133R for the starboard side outboard motor 3R). Specifically, the setting screen may be configured with the setup tab region 211 being positioned in a region taking up approximately the left half of the main screen 120. The user is thus enabled to see the engine speed display 133R for the starboard side outboard motor 3R even when the setup tab region 211 is being displayed. The engine speeds of the portside and starboard side outboard motors 3L and 3R are of equal or substantially equal value in a large portion of the time during operation of the small vessel 1 and it thus suffices to know the engine speed of one of the outboard motors in many cases.

With the preferred embodiments of the present invention, the ON/OFF panel 143 preferably is positioned at a position in common in the main screen 120, the equipment operation screens 151 to 157, and the setting screen 210. However, there is no need for the position of the ON/OFF panel 143 to be a position in common. For example, the ON/OFF panel 143 may be positioned as shown in FIG. 5B in the main screen 120 and may be positioned as shown in FIG. 5C so as not to overlap with the common information region 159 or 212 in any of the equipment operation screens 151 to 157 and the setting screen 210.

With the preferred embodiments of the present invention, an example has been illustrated where one display device 10 preferably is included in each of the vessel maneuvering stations 5M and 5S. However, each of the vessel maneuvering stations 5M and 5S may include a plurality of display devices and different screens may be displayed in these devices. In this case, by displaying the common display information in the plurality of display devices included in one vessel maneuvering station, the user is able to obtain the common display information by viewing any of the display devices. There is no need for the two vessel maneuvering stations of 5M and 5S to be provided, and just one vessel maneuvering station may be provided instead.

A plurality of display devices may be disposed in one vessel operator compartment and be made to display information on different propulsion devices. For example, if four outboard motors are included, the engine speeds, etc., of two outboard motors may be displayed on a first display device and the engine speeds, etc., of the other two outboard motors may be displayed on a second display device. The viewability is thus made better than in a case where the engine speeds, etc., of the four motors are displayed on a single display device. Or, the engine speeds, etc., may be displayed on the first display device and the equipment operation screens and the setting screen may be displayed in the second display device.

When any of the main screen 120, the equipment operation screens 151 to 157, and the setting screen 210 is being displayed, a popup display of warning information may be performed on the screen in response to the occurrence of an abnormality. The need to provide a warning display area in each screen is thus eliminated. The popup display region is preferably a semitransparent display to enable the image behind it to be seen through it.

The display state of an operation key may be controlled to not only express the operation state but also express whether or not the corresponding function is enabled or disabled. For example, even when the free throttle button 174 is operated in the propulsion device operation screen 151 (see FIG. 7), if the shift position is not the neutral position, control may be performed so that the transition of the operation mode to the free throttle mode is prevented. In such a case, it is preferable to set the display of the free throttle button 174 to a non-operable state in correspondence to the actual state of the outboard motors 3.

The example of the propulsion device is not restricted to an outboard motor. Examples of the propulsion device include water jet pumps, inboard/outboard motors, inboard motors, etc. The various preferred embodiments of the present invention can be applied even when a propulsion device of any form is used. The number of propulsion devices does not have to be two and may be one or not less than three. The motor of the propulsion device is not restricted to an engine and may be an electric motor. In the case of an electric motor, the display of the remaining amount of consumable energy is preferably the display of the remaining battery capacity.

The present application corresponds to Japanese Patent Application No. 2013-200199 filed in the Japan Patent Office on Sep. 26, 2013, and the entire disclosure of the application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vessel display system comprising:
   a first screen display unit configured to display a first screen on a display, the first screen including a main display region and a peripheral edge region that display vessel-related information related to navigation of a vessel;
   a second screen display unit configured to display a second screen on the display, the second screen including a tab region that overlaps at least a portion of the main display region of the first screen and that includes function information related to a function usable during the navigation of the vessel, and a peripheral edge region that includes a common information region displaying common display information including at least one of the vessel-related information displayed in the first screen; and a screen transition unit configured to perform a transition from the first screen to the second screen or from the second screen to the first screen; wherein the peripheral edge region of the first screen is in a same position on the display as the peripheral edge region of the second screen;

the peripheral edge region of the first screen and the peripheral edge region of the second screen have a common display configuration; and the common display information further includes at least one of a speed of the vessel, a water depth around the vessel, and a remaining amount of energy consumable by the vessel.

2. The vessel display system according to claim 1, wherein the common display information includes output information expressing an output of a propulsion device of the vessel.

3. The vessel display system according to claim 1, wherein the second screen includes an operation key operable by an operator.

4. The vessel display system according to claim 3, wherein the operation key includes a menu key by which a selection is made alternatively from a plurality of functions.

5. The vessel display system according to claim 4, wherein the plurality of functions include a vessel maneuvering input function by which an input to control a movement of the vessel is received.

6. The vessel display system according to claim 4, wherein the plurality of functions include an equipment control input function by which an input to control equipment included in the vessel is received.

7. The vessel display system according to claim 3, wherein the operation key includes a setting key by which setting information is input.

8. The vessel display system according to claim 1, wherein the second screen is configured so that the common information region in which the common display information is displayed is narrower than a remaining region of the second screen.

9. The vessel display system according to claim 1, wherein
the peripheral edge region of the first screen and the peripheral edge region of the second screen include an operation display region including an operation portion configured to be operated by an operator; and
the first screen is configured so that the main display region of the vessel-related information is wider than the operation display region including the operation portion.

10. The vessel display system according to claim 1, wherein the common display information is displayed in analog format in the first screen and in digital format in the second screen.

11. A small vessel comprising:
a plurality of equipment;
a controller configured or programmed to control the plurality of equipment; and
the vessel display system according to claim 1 that is connected to the controller.

12. The vessel display system according to claim 1, wherein the display is a single display and the first screen and the second screen are configured to be displayed on the single display.

13. A vessel display system comprising:
a first screen display unit configured to display a first screen on a display, the first screen including a main display region and a peripheral edge region that display vessel-related information related to navigation of a vessel;
a second screen display unit configured to display a second screen on the display, the second screen including a tab region that overlaps at least a portion of the main display region of the first screen and that includes function information related to a function usable during the navigation of the vessel, and a peripheral edge region that includes a common information region displaying common display information including at least one of the vessel-related information displayed in the first screen; and
a screen transition unit configured to perform a transition from the first screen to the second screen or from the second screen to the first screen; wherein
the peripheral edge region of the first screen is in a same position on the display as the peripheral edge region of the second screen;
the peripheral edge region of the first screen and the peripheral edge region of the second screen have a common display configuration;
the peripheral edge region of the first screen and the peripheral edge region of the second screen include an operation display region including an operation portion configured to be operated by an operator; and
the first screen is configured so that the main display region of the vessel-related information is wider than the operation display region including the operation portion.

14. A vessel display system comprising:
a first screen display unit configured to display a first screen on a display, the first screen including a main display region and a peripheral edge region that display vessel-related information related to navigation of a vessel;
a second screen display unit configured to display a second screen on the display, the second screen including a tab region that overlaps at least a portion of the main display region of the first screen and that includes function information related to a function usable during the navigation of the vessel, and a peripheral edge region that includes a common information region displaying common display information including at least one of the vessel-related information displayed in the first screen; and
a screen transition unit configured to perform a transition from the first screen to the second screen or from the second screen to the first screen; wherein
the peripheral edge region of the first screen is in a same position on the display as the peripheral edge region of the second screen;
the peripheral edge region of the first screen and the peripheral edge region of the second screen have a common display configuration; and
the tab region is touched to draw out the tab region such that the tab region overlaps a portion of the main display region of the first screen.

* * * * *